US007107286B2

(12) United States Patent
Burnett

(10) Patent No.: US 7,107,286 B2
(45) Date of Patent: Sep. 12, 2006

(54) INTEGRATED INFORMATION PROCESSING SYSTEM FOR GEOSPATIAL MEDIA

(75) Inventor: Carl M. Burnett, Silver Spring, MD (US)

(73) Assignee: GeoQwest International Inc., Columbia, MD (US)

( * ) Notice: Subject to any disclaimer, the term of this patent is extended or adjusted under 35 U.S.C. 154(b) by 0 days.

(21) Appl. No.: 10/691,544

(22) Filed: Oct. 24, 2003

(65) Prior Publication Data
US 2004/0083237 A1 Apr. 29, 2004

Related U.S. Application Data

(63) Continuation of application No. 09/626,801, filed on Jul. 26, 2000, now Pat. No. 6,681,231.

(60) Provisional application No. 60/145,694, filed on Jul. 26, 1999.

(51) Int. Cl.
G06F 17/30 (2006.01)
G06F 17/10 (2006.01)
H04N 7/025 (2006.01)

(52) U.S. Cl. ............... 707/104.1; 348/467; 701/300; 707/10

(58) Field of Classification Search ........... 707/10, 707/104.1, 1, 100, 101; 382/103; 701/200, 701/207, 213, 300; 348/473, 467
See application file for complete search history.

(56) References Cited

U.S. PATENT DOCUMENTS

| | | | |
|---|---|---|---|
| 4,709,148 A | | 11/1987 | Fox et al. |
| 4,855,827 A | * | 8/1989 | Best ........................ 348/485 |
| 5,371,532 A | | 12/1994 | Gelman |
| 5,418,713 A | | 5/1995 | Allen |
| 5,528,518 A | | 6/1996 | Bradshaw et al. |
| 5,584,025 A | | 12/1996 | Keithley et al. |

(Continued)

FOREIGN PATENT DOCUMENTS

CA 2174934 5/1995

(Continued)

OTHER PUBLICATIONS

"The NMEA FAQ", version 6.1, Sep. 15, 1997, http://www.kh-gps.de/nmea.faq.*

(Continued)

*Primary Examiner*—Jack M Choules
(74) *Attorney, Agent, or Firm*—Squire, Sanders & Dempsey L.L.P.

(57) ABSTRACT

An integrated information processing system for geospatial information processing. The information processing system includes a scheduling module, an acquisition module, a production module, a distribution module, a geospatial data specification, and a geospatial media recorder. Each module incorporates a common object database management system. The scheduling module is configured for processing requests for media acquisition. The acquisition module is configured for acquiring visual, audio, textual, and geospatial entity information. The production module is configured for producing integrated digital media datasets and information. The distribution module is configured for distributing integrated digital media datasets and information. The geospatial data specification includes an object class which serves to provide geospatial referencing of an entity or object. The concatenated data attribute of geospatial data serves to geospatially reference entities or object in a video segment. The geospatial media recorder serves to encode geospatial data onto video frames at the time of video acquisition.

17 Claims, 49 Drawing Sheets

U.S. PATENT DOCUMENTS

| | | | |
|---|---|---|---|
| 5,633,946 A * | 5/1997 | Lachinski et al. ........... 382/103 |
| 5,731,786 A * | 3/1998 | Abraham et al. ...... 342/357.08 |
| 5,734,719 A | 3/1998 | Tsevdos et al. |
| 5,736,977 A | 4/1998 | Hughes |
| 5,845,263 A | 12/1998 | Camaisa et al. .............. 705/15 |
| 5,852,810 A | 12/1998 | Sotiroff et al. |
| 5,867,155 A | 2/1999 | Williams |
| 5,893,113 A | 4/1999 | McGrath et al. |
| 5,909,638 A | 6/1999 | Allen |
| 5,945,985 A | 8/1999 | Babin et al. |
| 5,953,722 A | 9/1999 | Lampert et al. |
| 5,968,109 A | 10/1999 | Israni et al. |
| 5,999,924 A | 12/1999 | Bair et al. |
| 6,020,931 A | 2/2000 | Bilbrey et al. |
| 6,029,173 A | 2/2000 | Meek et al. |
| 6,038,568 A | 3/2000 | McGrath et al. |
| 6,047,234 A | 4/2000 | Cherveny et al. |
| 6,061,688 A | 5/2000 | Kilpatrick et al. |
| 6,141,570 A * | 10/2000 | O'Neill et al. .............. 455/574 |
| 6,188,962 B1 | 2/2001 | Morgan et al. |
| 6,282,362 B1 | 8/2001 | Murphy et al. |
| 6,310,661 B1 | 10/2001 | Arsenault |
| 6,317,718 B1 * | 11/2001 | Fano ............................. 705/1 |
| 6,421,653 B1 | 7/2002 | May |
| 6,496,870 B1 * | 12/2002 | Faustini ..................... 719/316 |
| 6,516,090 B1 | 2/2003 | Lennon et al. |
| 6,829,430 B1 | 12/2004 | Ashizaki et al. |

FOREIGN PATENT DOCUMENTS

| | | |
|---|---|---|
| CA | 2190596 | 11/1995 |
| CA | 2219037 | 4/1998 |
| CA | 2112101 | 8/1998 |
| EP | 0649121 | 4/1995 |

OTHER PUBLICATIONS

C. Davis, et al., "A Means for Expressing Location Information in the Domain Name System," Jan. 1996, Network Working Group, Request for Comments: 1876, Updates: 1034, 1035, Category: Experimental, pp. 1-18.

"Standard Representation of Latitude, Longitude and Altitude for Geographical Point Locations," May 15, 1983, International Standard (ISO) 6709, First edition, pp. 1-3.

* cited by examiner

Scheduling Module

Object-Oriented
Database Management
System
(ODBMS)

Geographic Information
System Application

*Fig. 5*

INTEGRATED INFORMATION PROCESSING SYSTEM FOR GEOSPATIAL MEDIA

CROSS-REFERENCE TO RELATED APPLICATION

This application is a continuation of U.S. patent application Ser. No. 09/626,801, filed on Jul. 26, 2000, now U.S. Pat. No. 6,681,231, and claims the benefit of U.S. Provisional Patent Application Ser. No. 60/145,694, filed Jul. 26, 1999, which are incorporated herein by reference.

BACKGROUND OF THE INVENTION

1. Field of the Invention

The present invention relates generally to media information processing systems and, more particularly, to an integrated system of specialized equipment modules for media information processing.

2. Description of the Related Art

The United States Census Bureau TIGER/Line™ files are a computer readable geographic database for the United States. The original sources of the database include U.S. geological survey maps, the 1980 U.S. Census Bureau DIME files, and various other sources. While these geographic files are usable as a base for a geographic information system, they are not recommended for detailed applications which require a high degree of positional accuracy. This is because the positional accuracy of the information contained in the file is limited by the scale of the U.S. Geological Survey maps from which the files are created.

In addition, information in the TIGER/Line™ files is only as complete and accurate as the source documents used by the U.S. Census Bureau and errors often occur in compilation and translation of information from source documents. Further, the information is only as current as the year in which the source documents were compiled and translated.

Because the information contained in a geographic information system such as the TIGER/Line™ files must be continually updated to reflect the most recent changes in the information contained therein, it is desirable to provide a method for collecting and processing video and spatial position information in a manner that allows updated attribute information to be tied to previously obtained spatial positional information.

One way in which to acquire accurate spatial position information is through the use of the Global Positioning System (GPS). The Global Positioning System is a network of satellites used to determine location. Since the orbital position of each satellite is known, a GPS receiver on the surface of the earth can accurately measure the time it takes for the transmitted signal to reach the receiver's location on earth. This measurement provides the distance between the satellite and the receiver. To obtain three dimensional positioning, the GPS receiver takes this measurement from each of at least four orbiting satellites. Using geometric principles, the information gathered by the GPS receiver can be used to calculate a tetrahedonal volume defined by four satellites and the receiver, and thus calculate an accurate spatial position on earth.

While the Global Positioning System can provide accurate spatial position information, problems arise when the GPS receiver is not able to receive information from at least four orbiting satellites. This occurs when the GPS receiver is obstructed by geographic features such as canyons or bluffs as well as man-made structures. Problems also arise when a signal transmitted by an orbiting satellite is reflected from a nearby object, giving the GPS receiver one or more incorrect readings from that satellite.

A further problem with the use of the Global Positioning System to provide spatial position information is that spatial position readings are often provided by the GPS receiver at a relatively slow rate; this depends on the quality of the receiver.

Several patents illustrate state-of-the-art distributive and geographic information systems. For example, U.S. Pat. No. 4,709,418 issued on Nov. 24, 1987 to John R. Fox et al. describes a wideband cable network in which several wideband services, such as television or video signals, can be provided simultaneously from a central service position to a remote wideband switch, to which several customers are connected. The central position is connected to the wideband switch by one or more passively tapped optical fibers, through which fixed-time services are provided and the central service position is connected to the wideband switch though one or more dedicated optical fibers, through which a customer can request and receive "on demand" wideband services.

U.S. Pat. No. 5,371,532 issued on Dec. 6, 1994 to Alexander Gelman et al. describes a communications architecture and method for distributing information services.

U.S. Pat. No. 5,418,713 issued on May 23, 1995 to Richard Allen describes an apparatus and method for an on demand data delivery system for the preview, selection, retrieval and reproduction at a remote location of previously recorded or programmed materials.

U.S. Pat. No. 5,528,518 issued on Jun. 18, 1996 to Mark Bradshaw et al. describes a system and method for collecting data to form a geographic information system database.

U.S. Pat. No. 5,584,025 issued on Dec. 10, 1996 to Ronald D. Keithley et al. describes an apparatus and method for interactive communication for tracking and viewing data. The apparatus is used for acquiring and displaying information relating to a specific field of interest. However, the apparatus does not describe specific methods for acquiring the information residing in the database or the manner in which the information will be related.

U.S. Pat. No. 5,633,946 issued on May 27, 1997 to Theodore M. Lachinski et al. describes a method and apparatus for collecting and processing visual and spatial position information from a moving platform. Global Positioning System data is captured separately while video recorders capture moving image sequences from a vehicle mounted apparatus. The Global Positioning System and Greenwich Mean Time data are correlated to video moving images during post video processing. However, Lachinski et al. fails to capture geospatial and video dimensionalities within an image at the time of creation. Moreover, Lachinski et al. fails to provide adequate functionalities necessary for efficient data processing.

U.S. Pat. No. 5,734,719 issued on Mar. 31, 1998 to James T. Tsevdos et al. describes a point-of-sale turnkey kiosk system for supplying digital content. The system employs geographically dispersed servers to provide content to the different kiosk locations. However, the system only provides information to a single computer network and is not developed for convergent delivery of various media data types and data sets to a variety of digital delivery networks.

U.S. Pat. No. 5,736,977 issued on Apr. 7, 1998 to Robert Lee Hughes describes a video real estate information service that includes regional offices that provide information over a computer network to local realty offices. The drawback of this service is that the service fails to calculate the data capacity required for providing video over a data network.

Another drawback is that the lengths of the video segments are not identified and, therefore, an unknown capacity of the network must be designed. Moreover, the service only provides information to one class of user and to a single computer network. The service is not developed for convergent delivery of various media data types and datasets to varying digital delivery networks.

U.S. Pat. No. 5,852,810 issued on Dec. 22, 1998 to James P. Sotiroff et al. describes a geographic specific information search system and method. The system is configured to display a graphical map and to allow the user to narrow the geographical search area to the desired region. The system is also configured to accept a query criteria and search a database containing property listings for properties listed in the desired region meeting the entered search criteria.

U.S. Pat. No. 5,867,155 issued on Feb. 2, 1999 to Douglass Williams describes a video on demand distributed network for viewing real estate media. The patent describes distribution over large distributed data networks but never identifies the end use of the data. A drawback of this service is that it provides information to one class of user. The information is also only provided to computer networks and is not developed for convergent delivery of various media data types and datasets to varying digital delivery networks.

U.S. Pat. No. 5,893,113 issued on Apr. 6, 1999 to Timothy McGrath et al. describes a system and method for providing incremental updates of geographical data in navigation systems. However the date that an object is created or its geospatial location is not captured except for when an object is involved in a transaction. This level of geographic detail is insufficient to provide detailed geospatial information on media properties and suffers deficiencies that include lack of dimensionality and timestamping. Additionally, a distribution scheme that includes digital delivery networks is not identified.

U.S. Pat. No. 5,909,638 issued on Jun. 1, 1999 to Richard D. Allen describes a detailed network for storing and retrieving movies on demand from video retail stores or cable television systems. The network capacity cannot be accurately determined because of the different size videos that will be accessed over the network. Furthermore, no identification of the processes needed to acquire geographic media from the source has been identified. The system described does not provide information to networks for broadcasting or cablecasting and is not developed for convergent delivery of various media data types and datasets to varying digital delivery networks.

U.S. Pat. No. 5,945,985 issued on Aug. 31, 1999 to Babin et al, describes a three-dimensional, computer simulated, interactive multimedia geographic system. The system does not have a distributed delivery capability or geospatially referenced derived entities. The system does not provide information for broadcasting or cablecasting and the system is not developed for convergent delivery of various media types and datasets.

U.S. Pat. No. 5,953,722 issued on Sep. 14, 1999 to David S. Lampert et al. describes a system and method for forming and using a geographic database. The database is populated with geographic entities and these entities are described as having a unique physical location identification record or data attribute, which may be comprised of geospatial parameters. The geospatial parameters that are recommended for each entity are geographical coordinates and optionally absolute or relative altitude. The disclosure further describes a method of parcelization, representing a physical region based on geographic parameters. Although the location identification record may incorporate geographic coordinates and altitude, the system does not use concatenated geospatial parameters or timestamping data.

U.S. Pat. No. 5,968,109 issued on Oct. 19, 1999 to Vijaya S. Israni et al. describes a system and method for use and storage of geographic data on physical media. Representations of the data are based on navigational dimensional units, which expresses geographic coordinates as a derived unit of measure. As such, this system does not include temporal parameters and therefore suffers the same deficiencies as U.S. Pat. No. 5,953,722.

U.S. Pat. No. 5,988,078 issued on Nov. 23, 1999 to Michael R. Levine describes a method and apparatus to receive information over a wide-area network based on geographic location. In this apparatus the information provided is based on zip code geographic orientation. This level of geographic detail is insufficient to provide detailed geospatial information on entities and suffers deficiencies that includes lack of dimensionality and timestamping.

U.S. Pat. No. 5,999,924 issued to John Bair et al. describes a method and apparatus to produce sequenced queries that takes into account a range of values of a variable defined by a start and end point in performing the query. The start or end points are calculated if necessary and a query to collect all the start and end points may be generated, and a query is generated that produces a constant set of start and end points defining consecutive periods, such that all the data in the tables related to the original query is constant over each of these periods. These two queries are merged into the original query to produce a sequenced query capable of execution on various database software and capable of taking into account the range of values of the variable in performing the original query.

U.S. Pat. No. 6,029,173 issued to James A. Meek et al. on Feb. 22, 2000 describes a method and system for representation and use of shape information in geographic databases. Polynomial equations are used to generate control points for generating a Bezier curve for feature representation. The disclosed method is sufficient to provide detailed geospatial information on topological features but not on media entities. The lack of geographic positioning, dimensionality, and timestamping does not provide the requisite data for geospatial media management.

U.S. Pat. No. 6,038,568 issued on Mar. 14, 2000 to Timothy McGrath et al. describes a transaction method and programming for incrementally updating a geographic database. The database taxonomy fails to capture the date that the object was created or its geospacial location except when an entity is involved in a transaction. This level of geographic detail is insufficient to provide detailed geospatial information on media entities and suffers deficiencies that include lack of dimensionality and timestamping.

U.S. Pat. No. 6,047,234 issued on Apr. 4, 2000 to Kevin Cherveny et al. describes a system and method of updating, enhancing or refining a geographic database. In this system vehicles retrofitted with data collecting sensors collect data with a feedback mechanism for inclusion into a geographical database. Under this system operation geographical data is feed directly to databases on-board the vehicles. In this specification the data captured is topological data for a topological geographical database. This level of geographic detail is insufficient to provide detailed geospatial information on media entities and suffers deficiencies that include lack of dimensionality and timestamping.

U.S. Pat. No. 6,061,688 issued on May 9, 2000 to Paul E. Kilpatrick et al. describes a computer system that creates a metadata file having records connected to geographic locations on a map. Users access a "Spacial Database Engine" to match longitude and latitude. This generates a data key whereby users can query a metadata database where the key is matched to locations in a geographic database and index records, based on location, are presented. In this specification the metadata created is referenced to topological data from a topological geographical database. This level of geographic detail is insufficient to provide detailed geospatial information on media entities and suffers deficiencies that include lack of dimensionality, altitude referencing and timestamping.

Canadian Patent No. 2,112,101 issued on May 20, 2000 to David A. Wysocki et al. describes a positioning, navigation, and collision avoidance system for ships, aircraft, land vehicles and the like, which utilizes a geo-referenced digital orthophotograph database and a positioning signal to display upon a computer stereo graphics device a high visibility dynamic photographic image of the user's immediate environment, including both moving and stationary obstacles.

Canadian Patent No. 2,174,934 issued on May 20, 2000 to Ronald D. Keithley et al. describes an interactive multimedia communications system which access industry-specific information. An information processing system for acquiring and displaying information relating to a specific industry or interest.

European Patent No. 0,649,121 issued on Apr. 19, 1995 to Robert S. Barnhill et al. describes a digital data on-demand turnkey system at a customer premise wherein N number of servers provide for 100% of content distribution of remotely stored digitized information, which information may be previewed in real-time, and product incorporating selected digitized information that can be manufactured on-site and within a short response time to a customer's request at a point of sale location.

Canadian Patent No. 2,190,596 issued on May 20, 2000 to Theodore M. Lachinski et al describes a method for collecting and processing visual and spatial position information to form a geographic information database. Additionally, the information may be used to accurately determine the spatial position of an object seen in the collected visual information.

Canadian Patent No. 2,219,037 issued on May 20, 2000 to Grant S. Killey et al. describes an improved method and system that provides for a data access interface layer in a navigation system. The navigation system is of the type that includes a navigation application software program that provides navigating features to a user of the system and a geographic database stored on a computer-readable storage medium, wherein the geographical database includes information relating to the geographical region about which the navigation system provides the navigation features to the user.

None of the above inventions and patents, taken either singly or in combination, is seen to describe the instant invention as claimed.

SUMMARY OF THE INVENTION

The present invention is an integrated information processing system for geospatial media information processing. The information processing system includes a scheduling module, an acquisition module, a production module, a distribution module, a geospatial data specification, and a geospatial media recorder. Each module incorporates a common object database management system. The scheduling module is a specially configured module suitable for processing requests for media acquisition. The acquisition module is a specially configured module suitable for acquiring visual, audio, textual, and geospatial entity information. The production module is a specially configured module suitable for producing integrated digital media, datasets, and information. The distribution module is a specially configured module suitable for distributing integrated digital media metadata, datasets, and information. The geospatial data specification serves to provide geospatial referencing of an entity or object in a video segment. The geospatial media recorder serves to encode geospatial referencing elements onto video frames at the time of video acquisition.

Accordingly, it is a principal object of the invention to provide an integrated information processing system for processing visual, audio, textual and geospatial data.

It is another object of the invention to provide an integrated information processing system for processing geospatial media data.

It is a further object of the invention to provide an integrated information processing system capable of convergent distribution of data to any media outlet.

Still another object of the invention is to provide an integrated information processing system capable of providing acquisition of geospatial entities, such as geospatial temporal referencing.

It is an object of the invention to provide improved elements and arrangements thereof in an apparatus for the purposes described which is inexpensive, dependable and fully effective in accomplishing its intended purposes.

BRIEF DESCRIPTION OF THE DRAWINGS

FIG. 5 is an illustration of a preferred scheduling module.

Similar reference characters denote corresponding features consistently throughout the attached drawings.

DETAILED DESCRIPTION OF THE PREFERRED EMBODIMENTS

The present invention is an integrated system of hardware and software modules for processing visual, audio, textual, and geospatial information. The integrated system uses a preferred process and architecture for improved data throughput, security, and scalability.

Figure 1A:
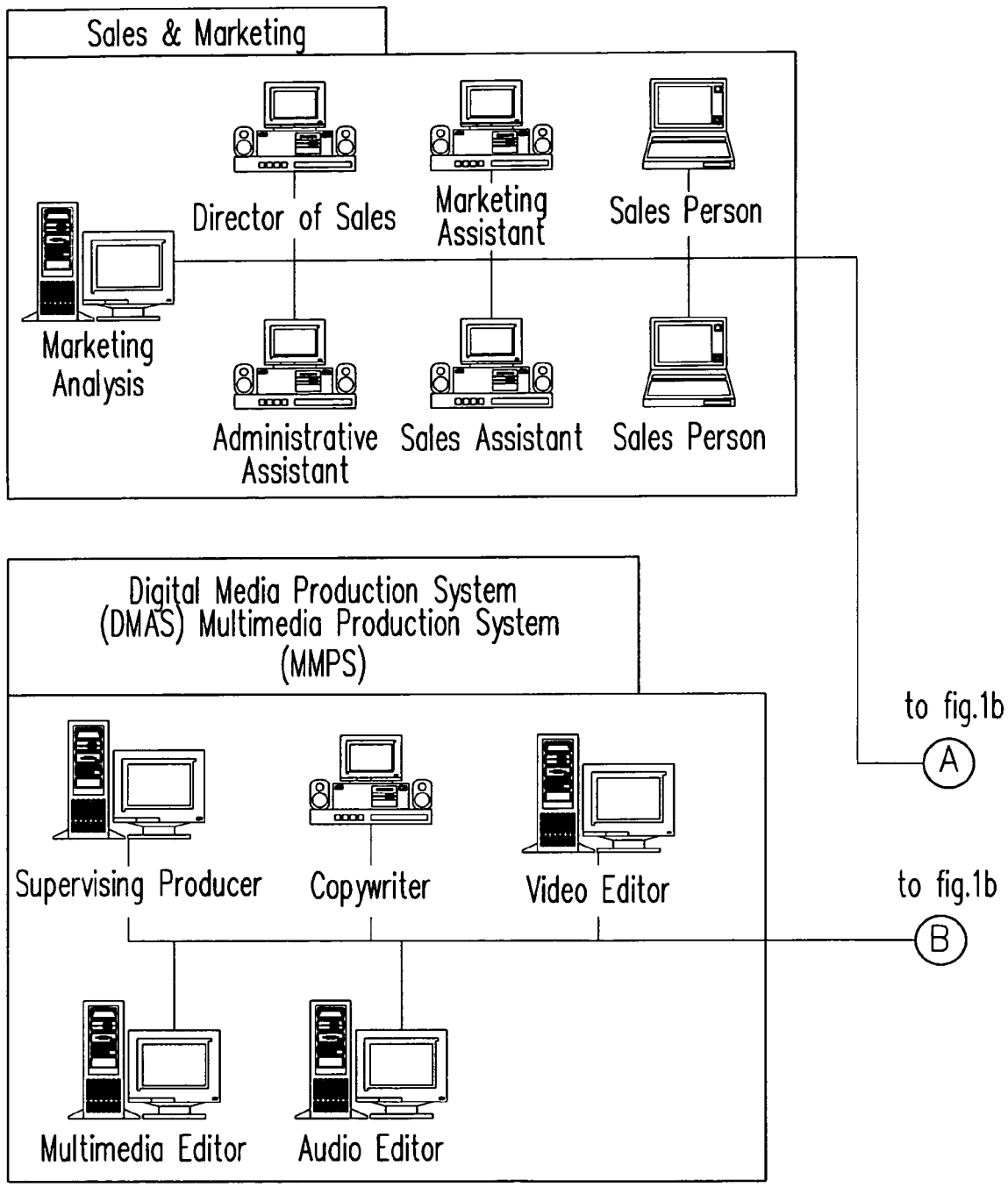
FIG. 1a is a block diagram of a first portion of a preferred data network for a local operation center.
Figure 1B:
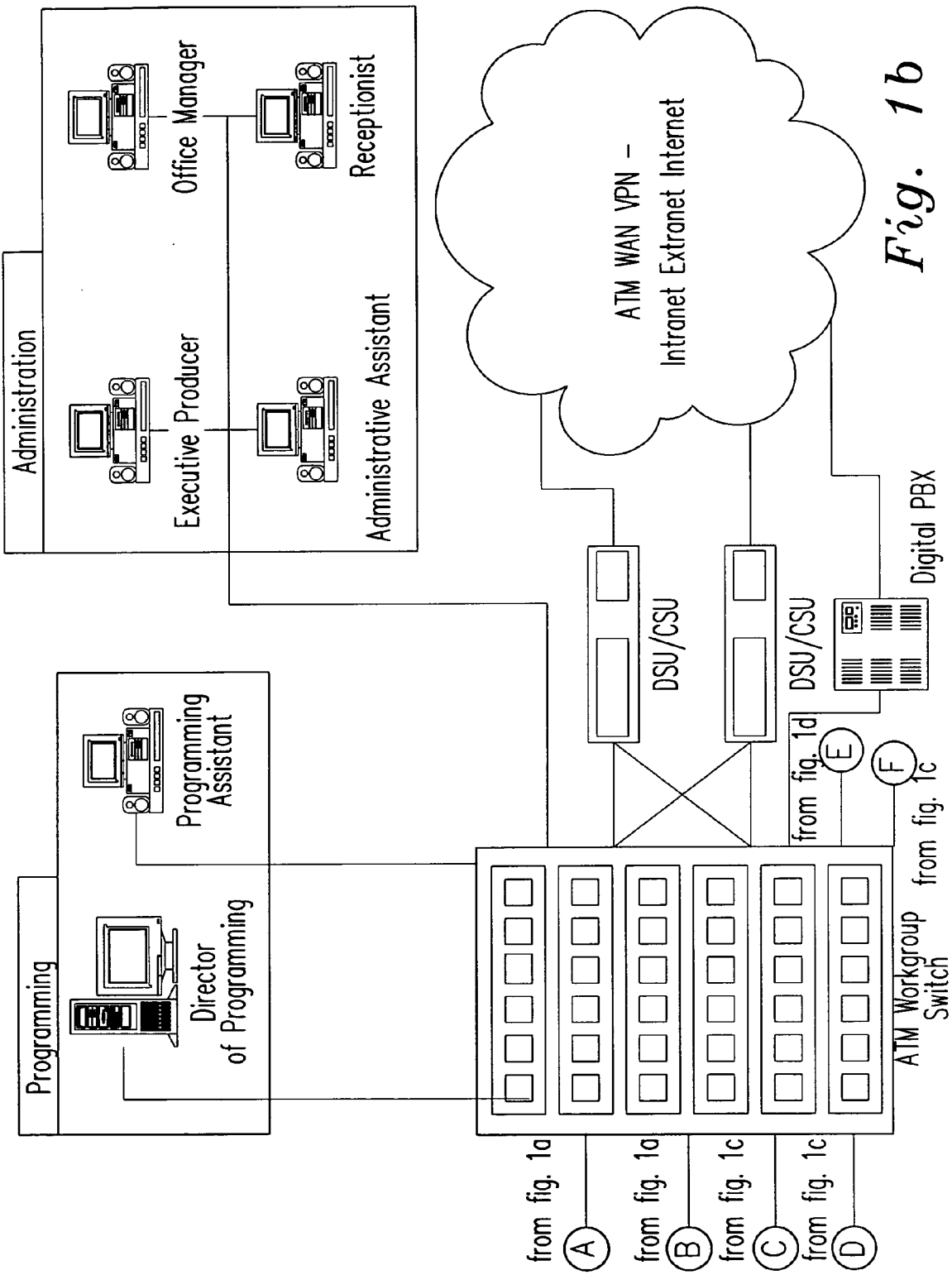
FIG. 1b is a block diagram of a second portion of the preferred data network for a local operation center.
Figure 1C:
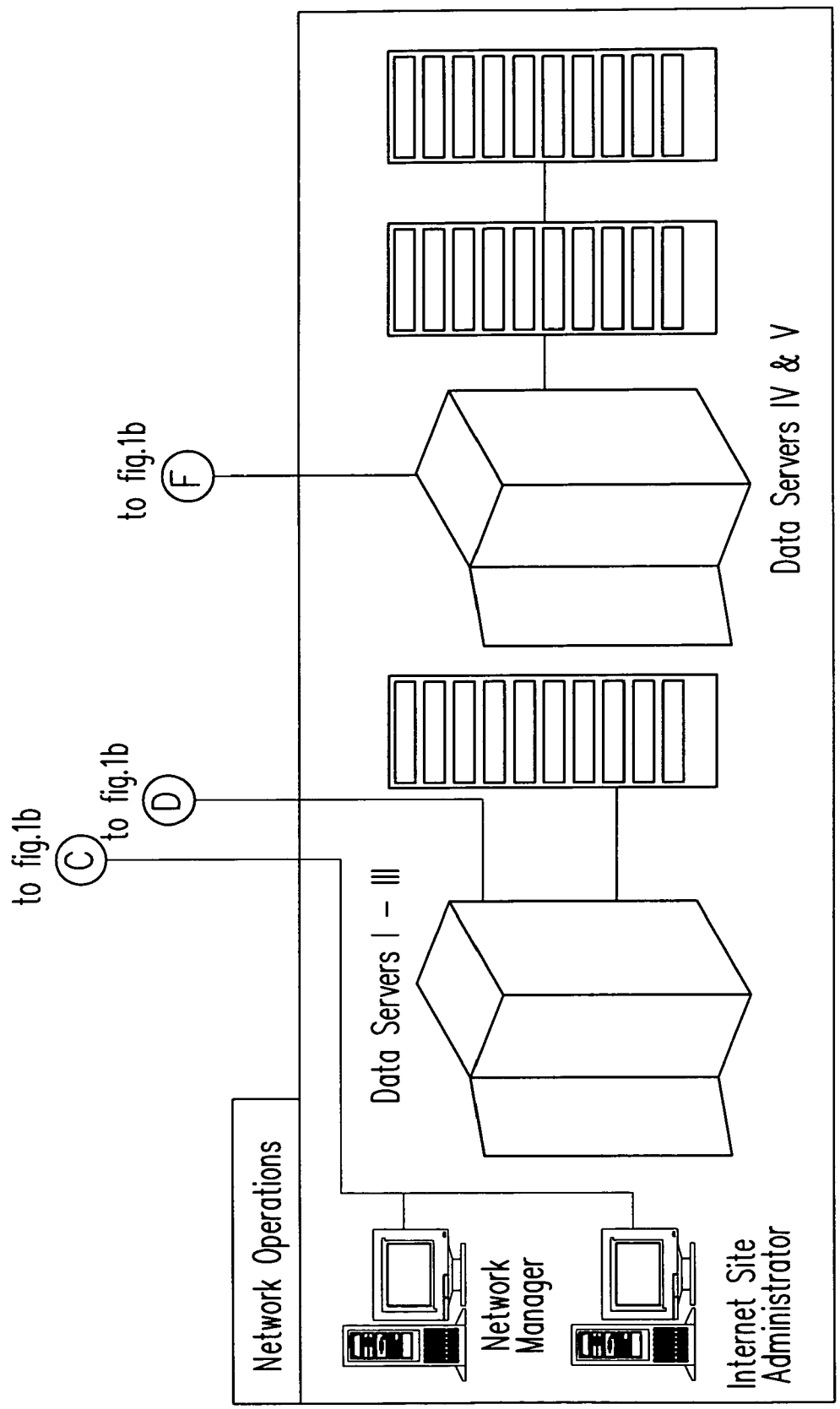
FIG. 1c is a block diagram of a third portion of the preferred data network for a local operation center.
Figure 1D:
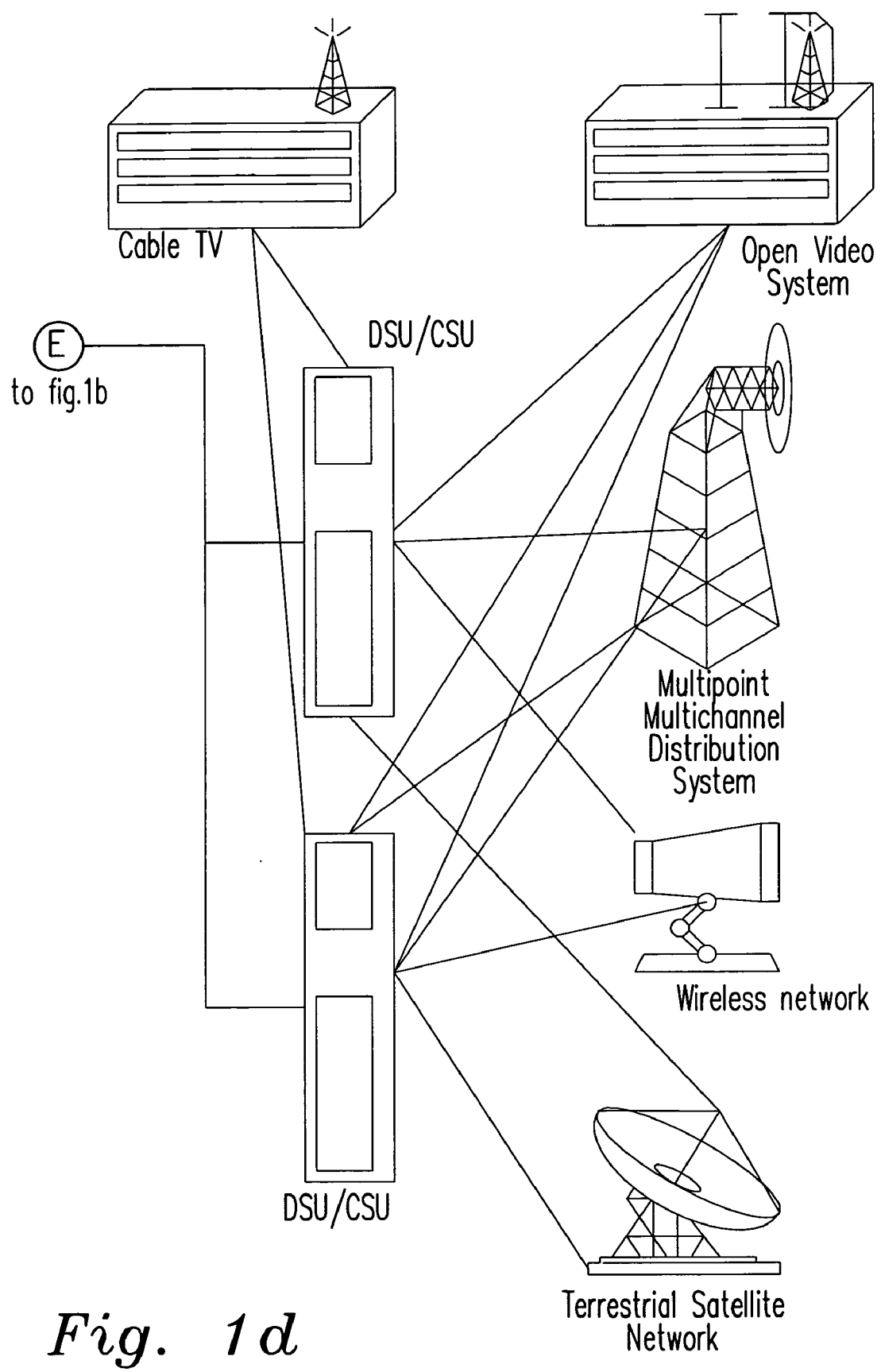
FIG. 1d is a block diagram of a fourth portion of the preferred data network for a local operation center.
Figure 2A:
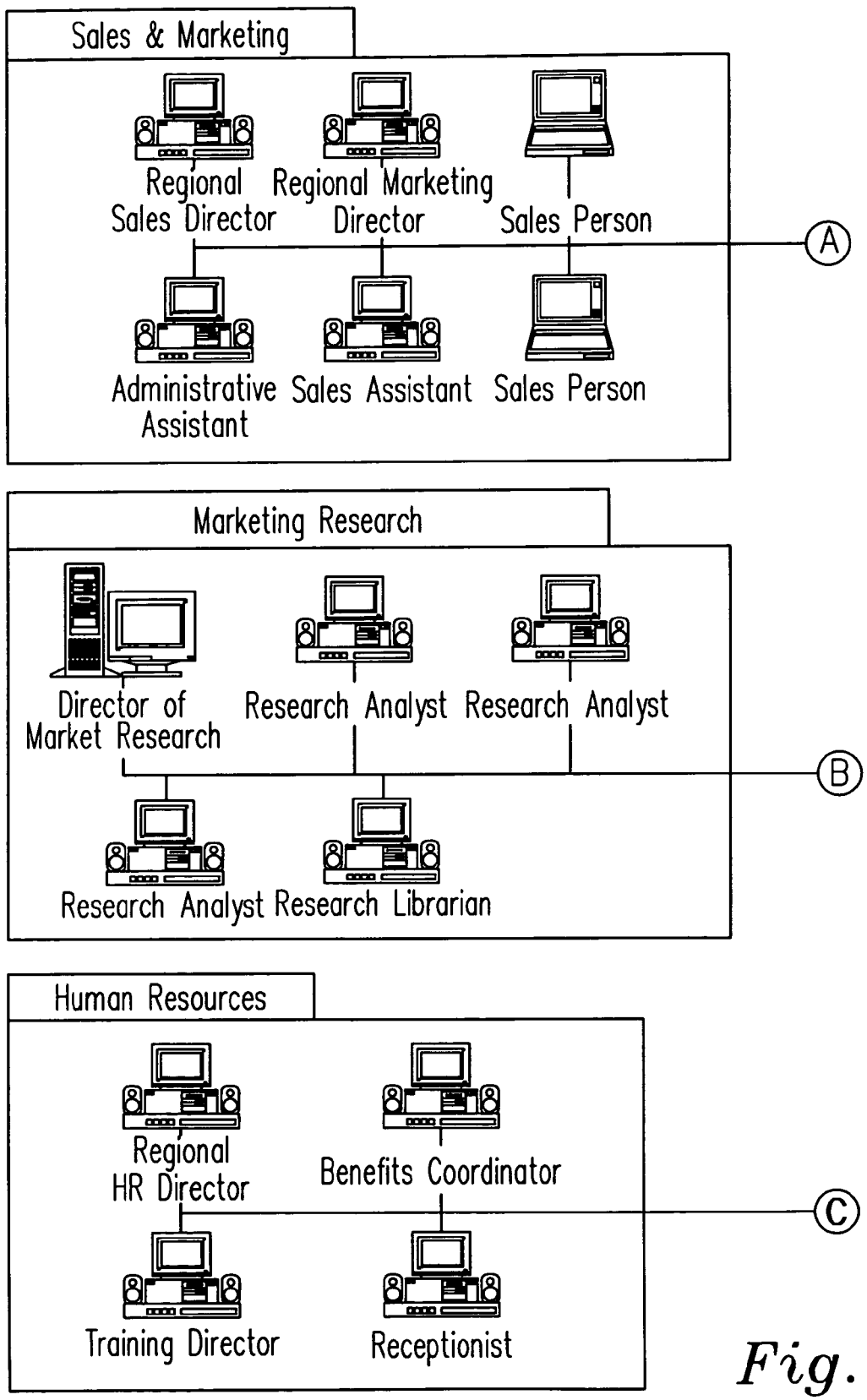
FIG. 2a is a block diagram of a first portion of a second preferred data network for a regional operation center.
Figure 2B:
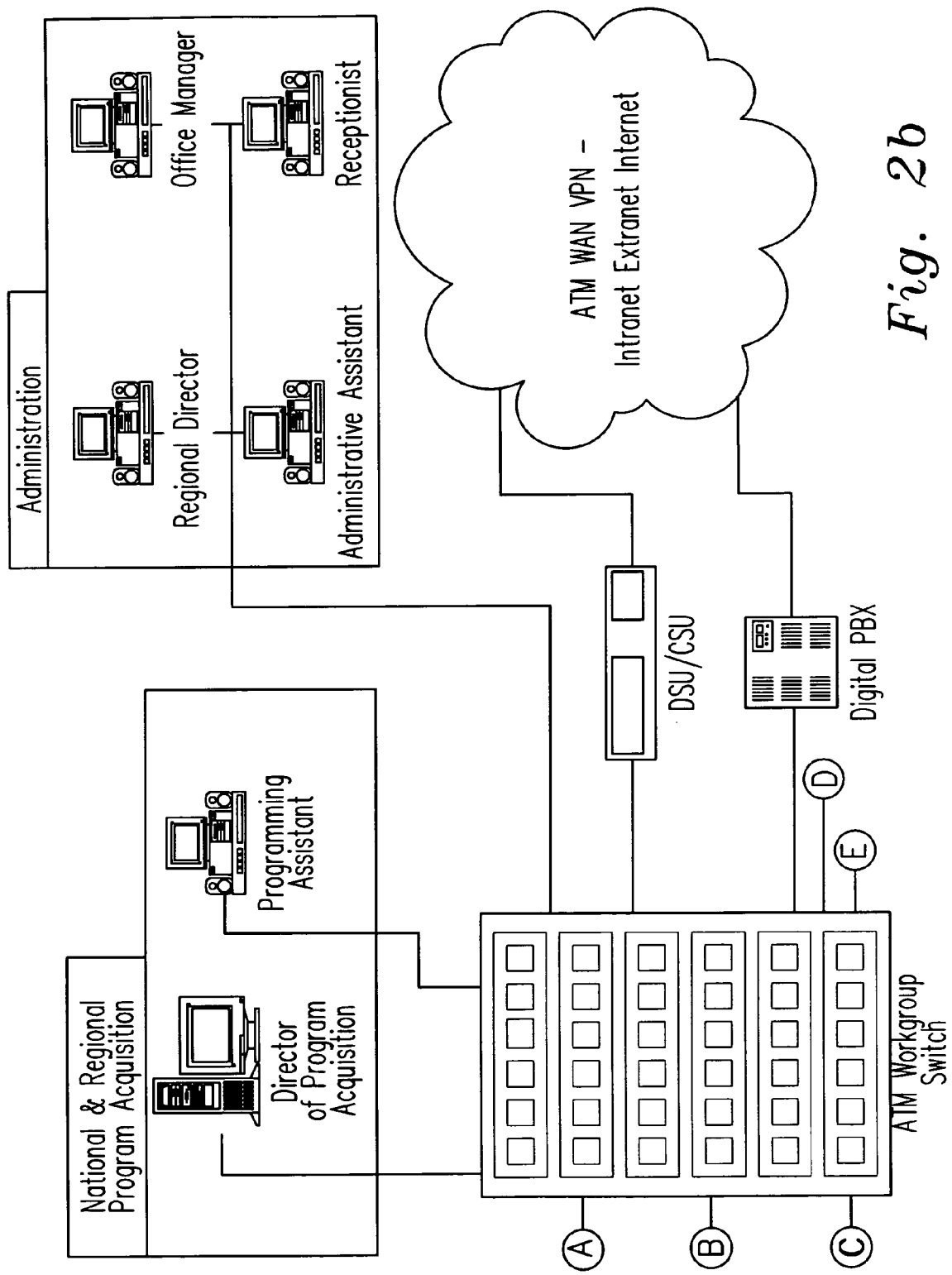
FIG. 2b is a block diagram of a second portion of the second preferred data network for a regional operation center.
Figure 2C:
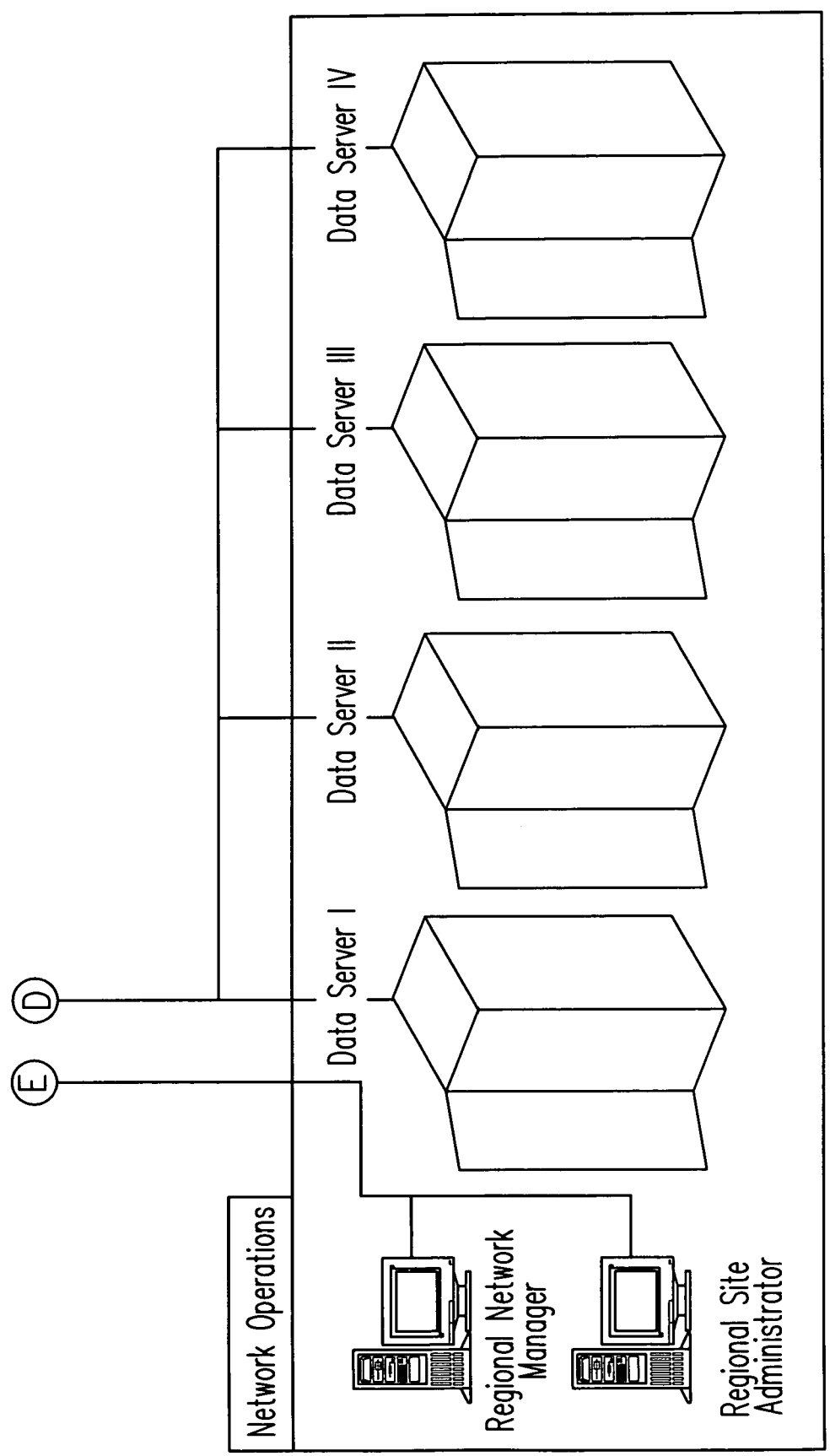
FIG. 2c is a block diagram of a third portion of the second preferred data network for a regional operation center.
Figure 3:
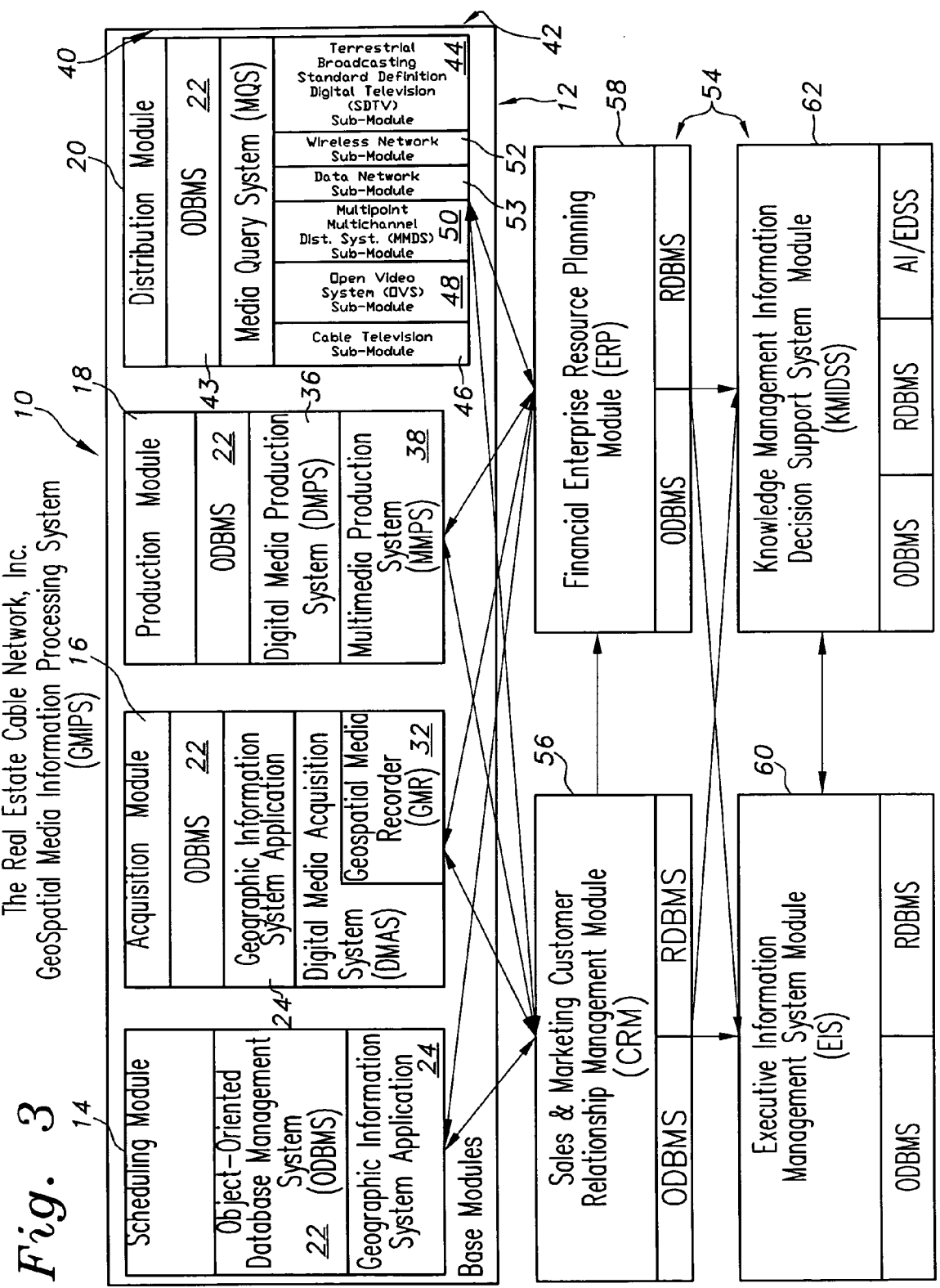
FIG. 3 is a block diagram of a preferred system for a geospatial media information processing system.
Figure 4A:
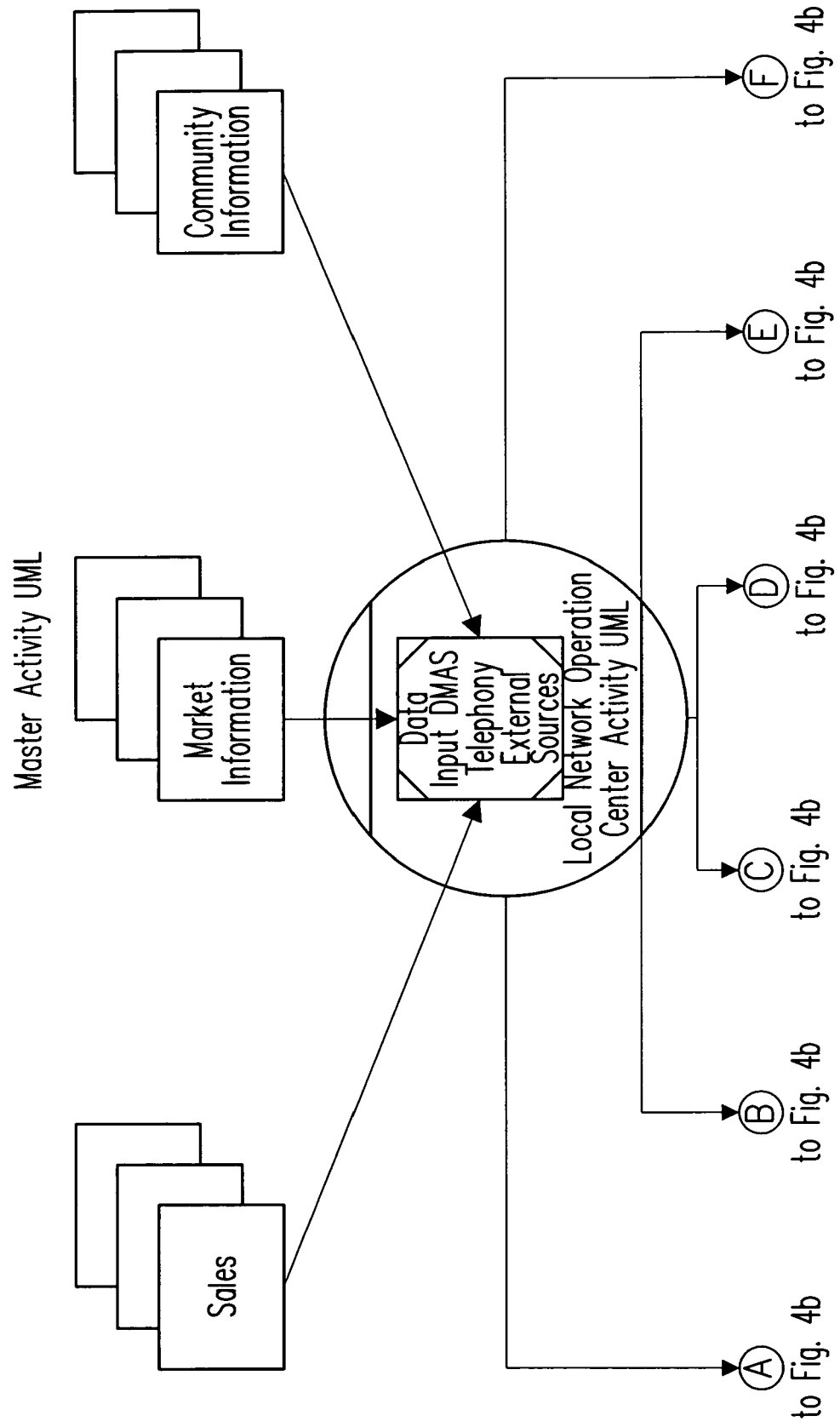
FIG. 4a is a flowchart of a first portion of a first preferred computer process for a master activity program.
Figure 4B:
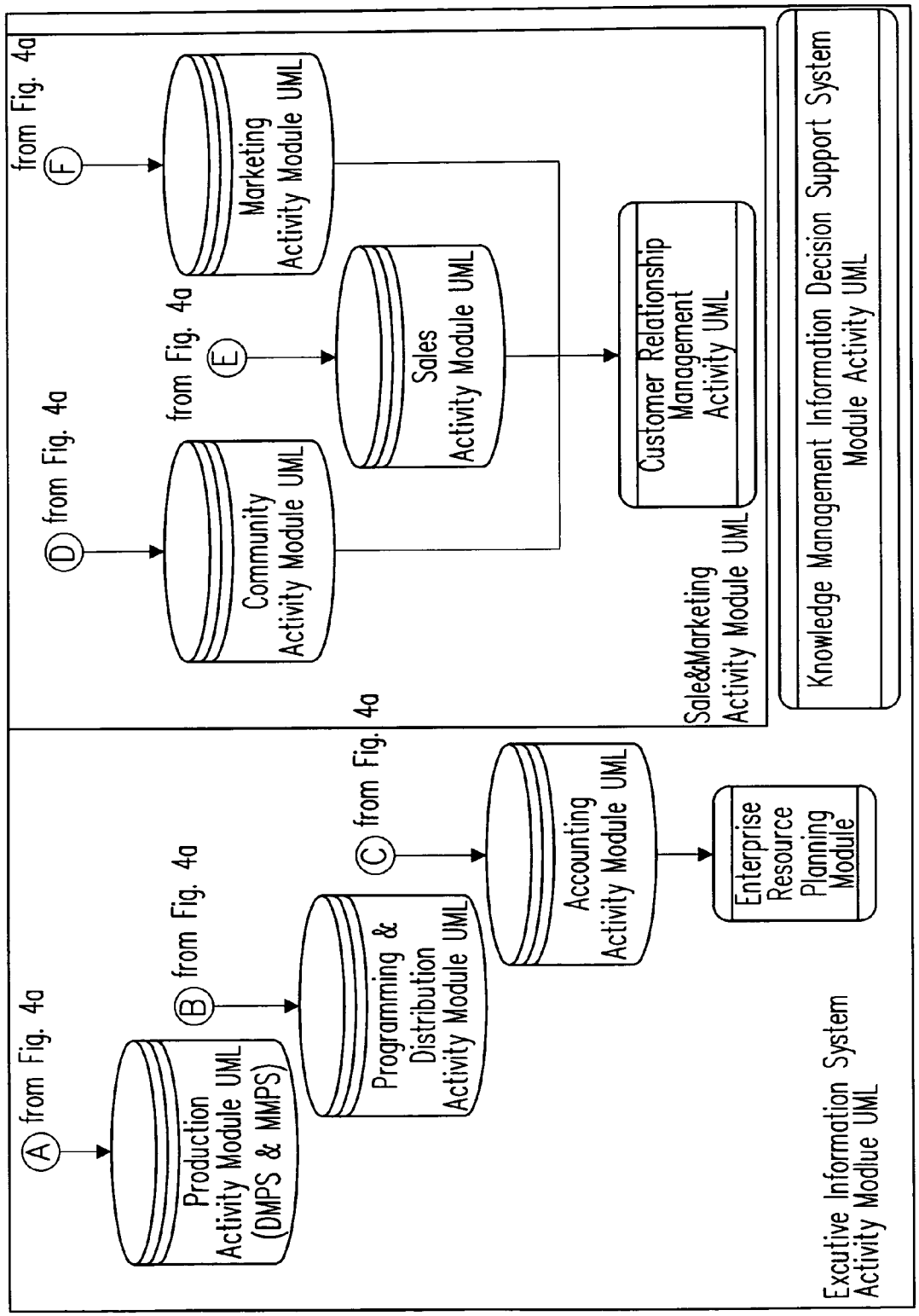
FIG. 4b is a flowchart of a second portion of the first preferred computer process for a master activity program.
Figure 6:
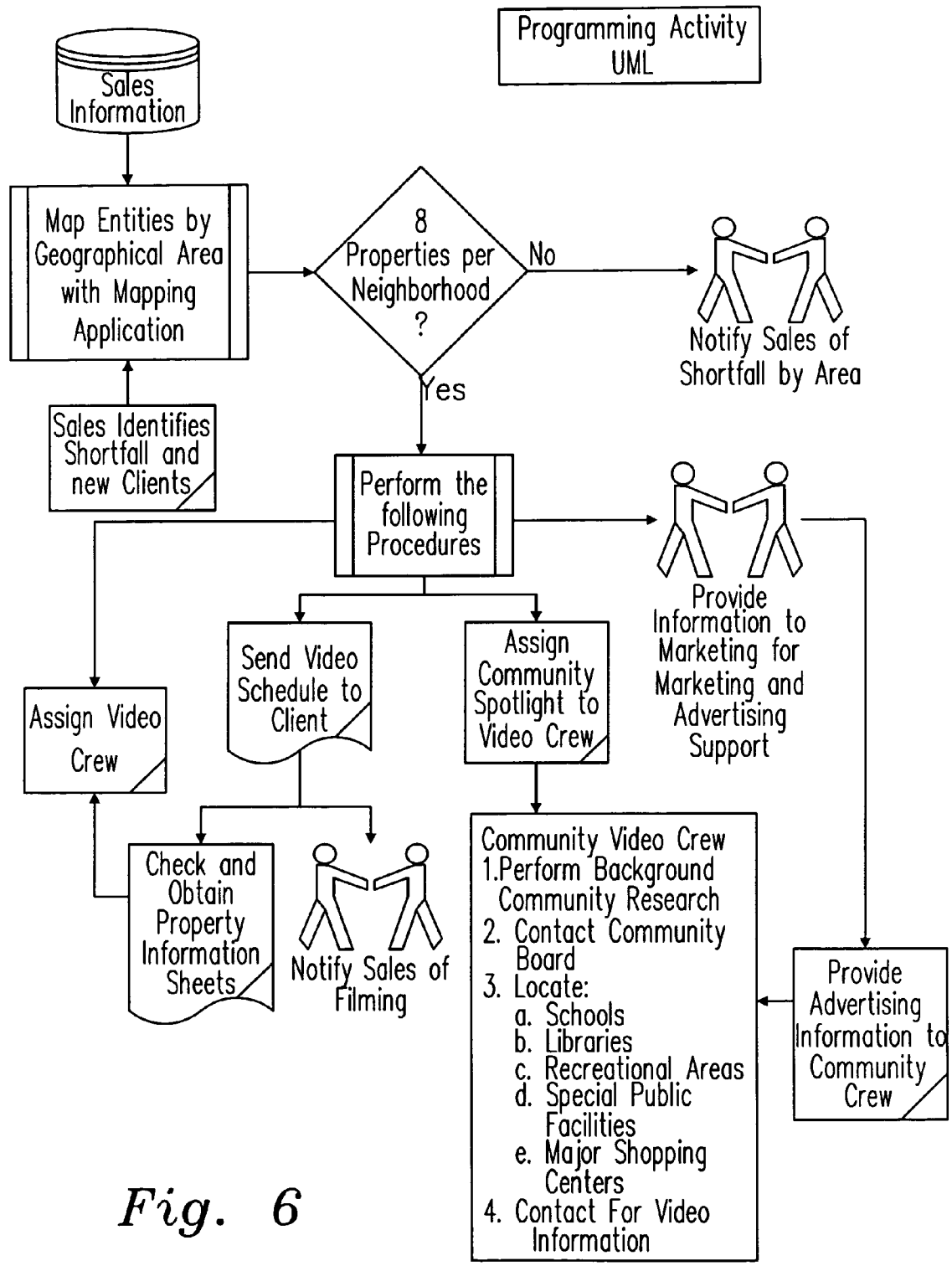
FIG. 6 is a flowchart of a second preferred computer process.

An integrated system 10 of modules according to a preferred embodiment of the present invention is shown in FIG. 3. The integrated system 10 is a geospatial media information processing system (hereinafter referred to as GMIPS). GMIPS is preferably configured to include a plurality of base modules 12 for providing minimum functionalities of media information processing. The base modules 12 incorporate information processing and are developed for use in a specially designed cell-based local area network (LAN) for each operating center. The base modules 12 are preferably configured to include a scheduling module 14, an acquisition module 16, a production module 18, and a distribution module 20. Each module 12 contains an information management software application 22. The information management software application 22 is a conventional object database management system (ODBMS). The ODBMS 22 has a central application interface that provides data management and warehousing administration. An ODBMS, like Objectivity, may be used as the central ODBMS.

The Scheduling Module. The scheduling module 14 serves to process all requests for media acquisition. The scheduling module 14 also programs a daily production schedule, distribution-programming grid and data network programming. The scheduling module 14 contains three information applications to provide media acquisition scheduling-namely a shared ODBMS 22, a shared geographic information system (GIS) application 24, and an information exchange program (not shown). Each application has a proprietary management front-end. Information concerning projected production requests are entered into the ODBMS 22 and used by the programming department to schedule media acquisition. The GIS application 24 provides geographic maps and computes least-cost-routing based on identified positioning for efficient media acquisition. This information is also entered into the ODBMS 22 for use in development of the daily media acquisition schedules.

Figure 7A:
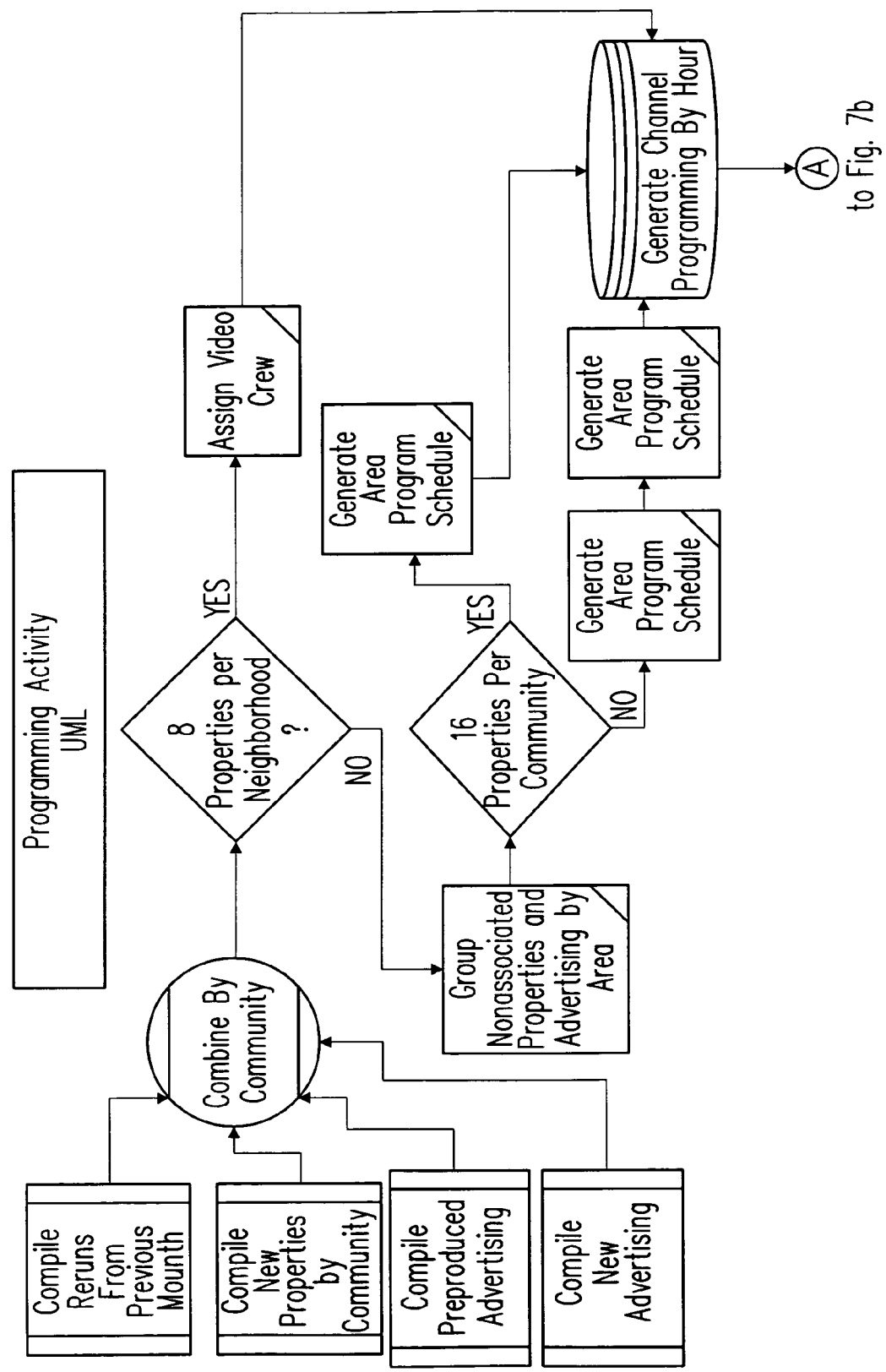
FIG. 7a is a flowchart of a first portion of a third preferred computer process for media planning scheduling activity.
Figure 7B:
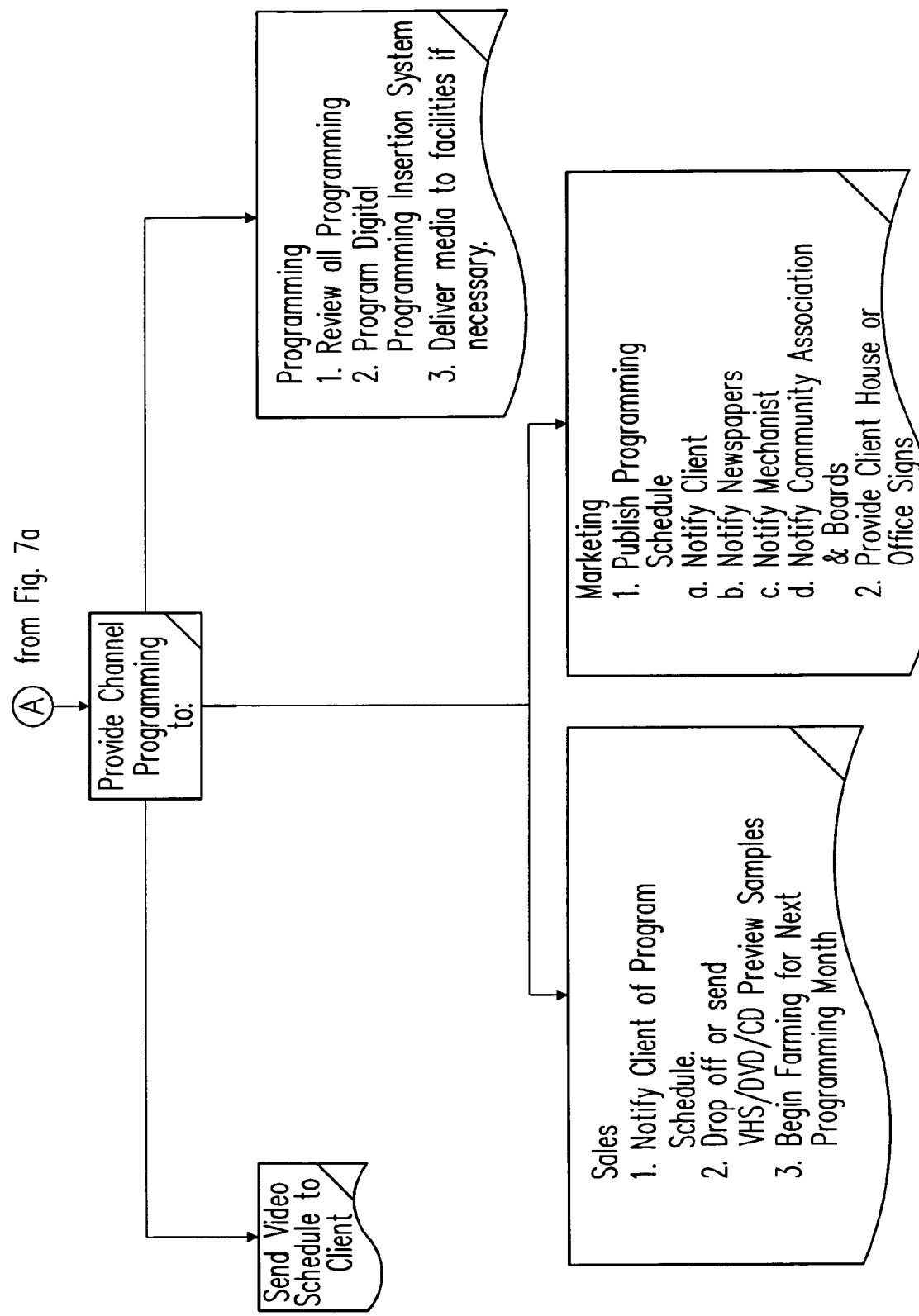
FIG. 7b is a flowchart of a second portion of the third preferred computer process for media planning scheduling activity.
Figure 8:
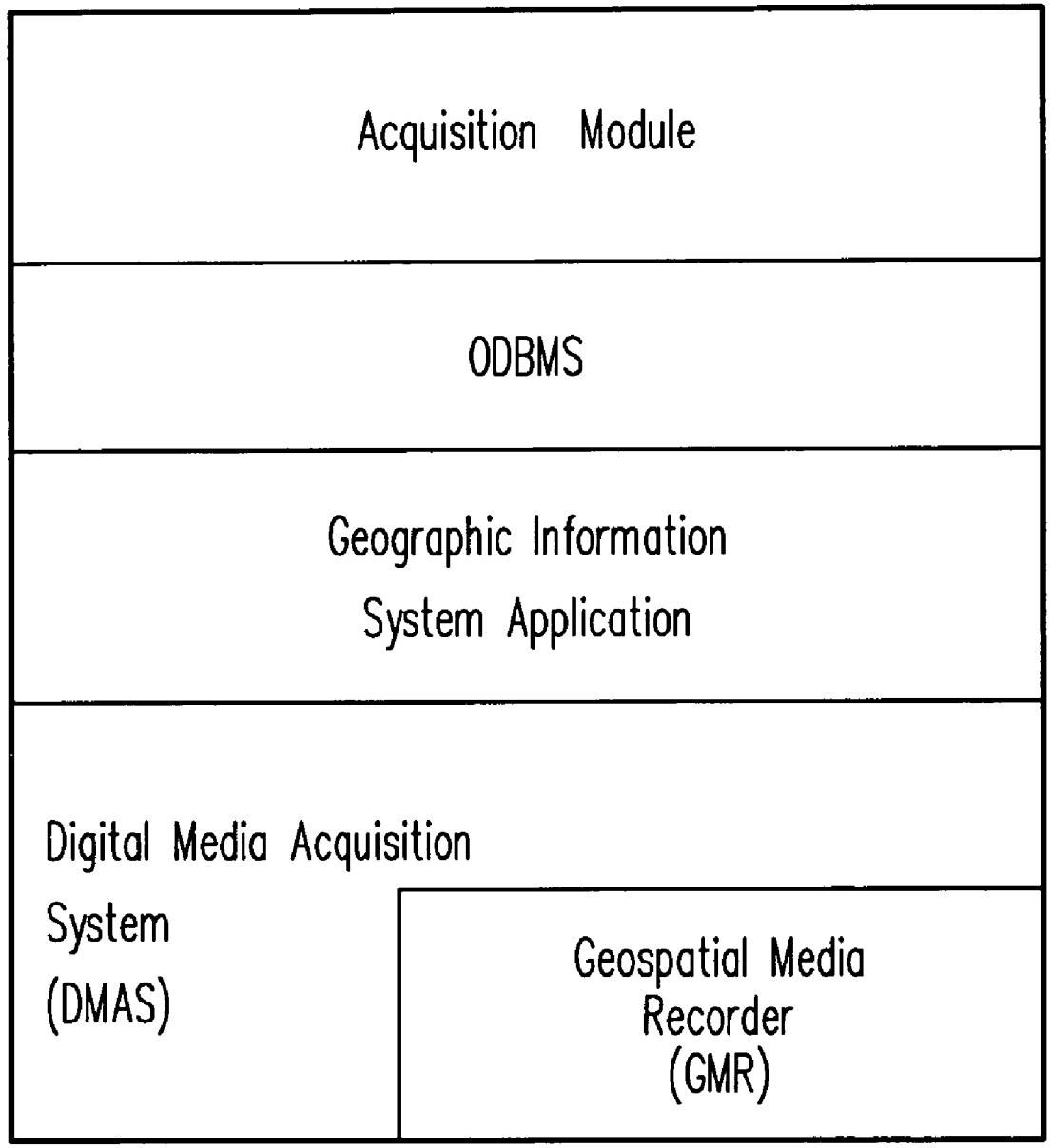
FIG. 8 is an illustration of an acquisition module according to a preferred embodiment of the present invention.

Following completion of media acquisition, a programming department also uses specialized information applications to update the daily programming grid and data network programming with newly produced digital media datasets. The programming grid automatically programs the distribution of media datasets by geographic area over distribution networks. The distribution is dependent on the type of media outlet where the datasets will be distributed. The distribution module 20 performs that actual distribution of datasets to private and public information networks. The activity UML used in the scheduling module 14 are listed in FIGS. 7a and 7b.

Figure 9:
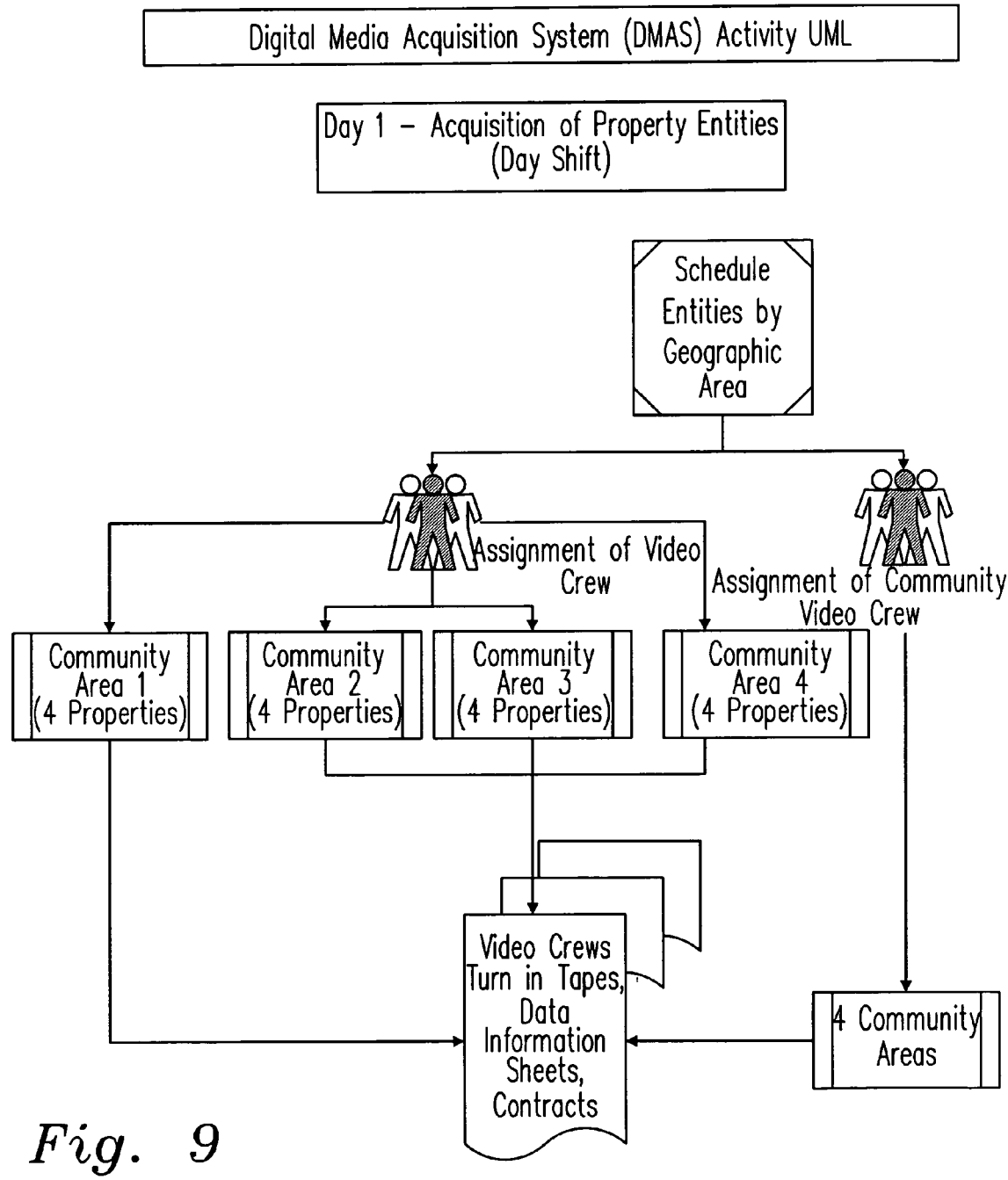
FIG. 9 is a flowchart of a fourth preferred computer process for digital media acquisition activity.
Figure 10:
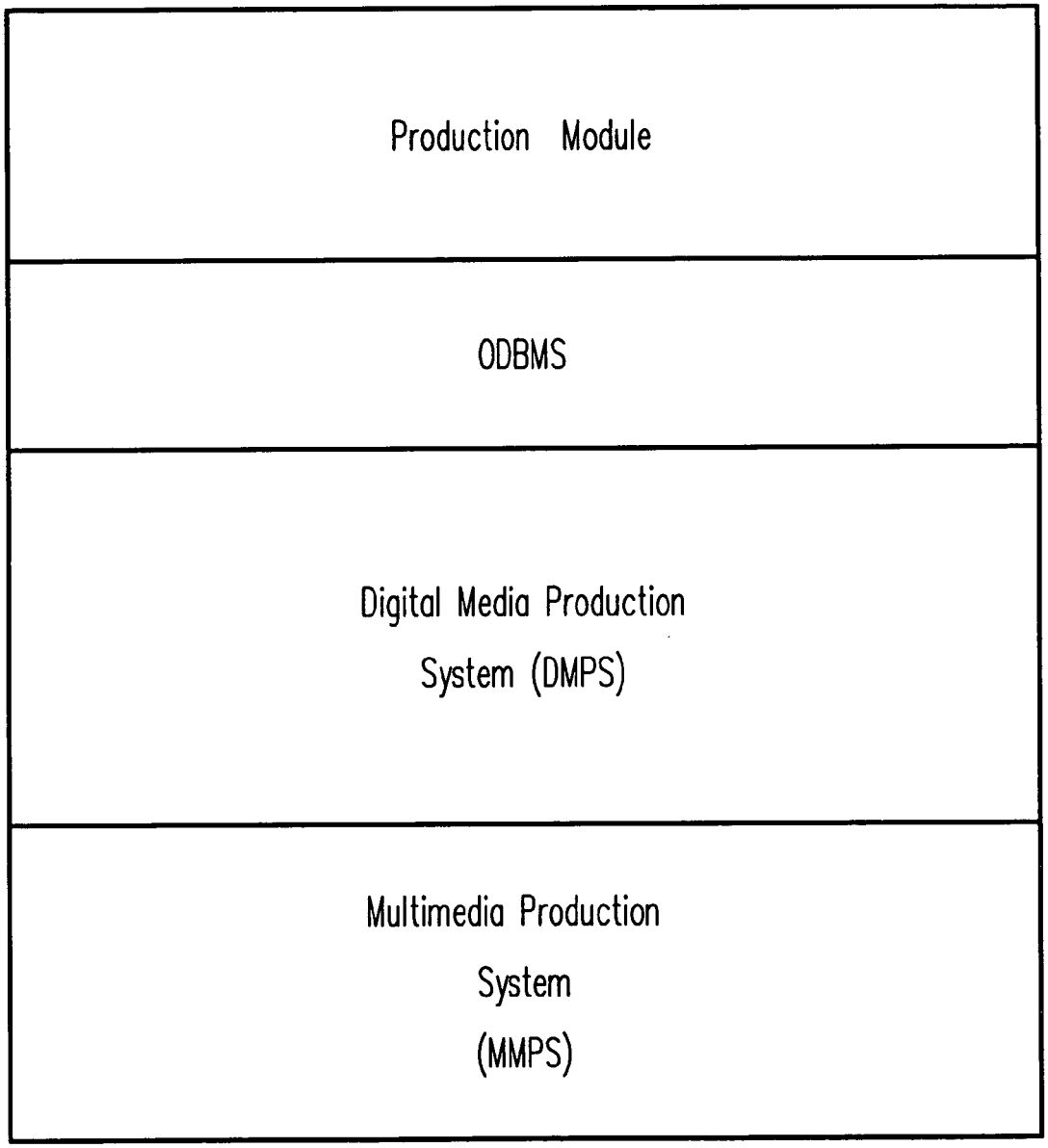
FIG. 10 is an illustration of a production module according to the present invention.
Figure 11A:
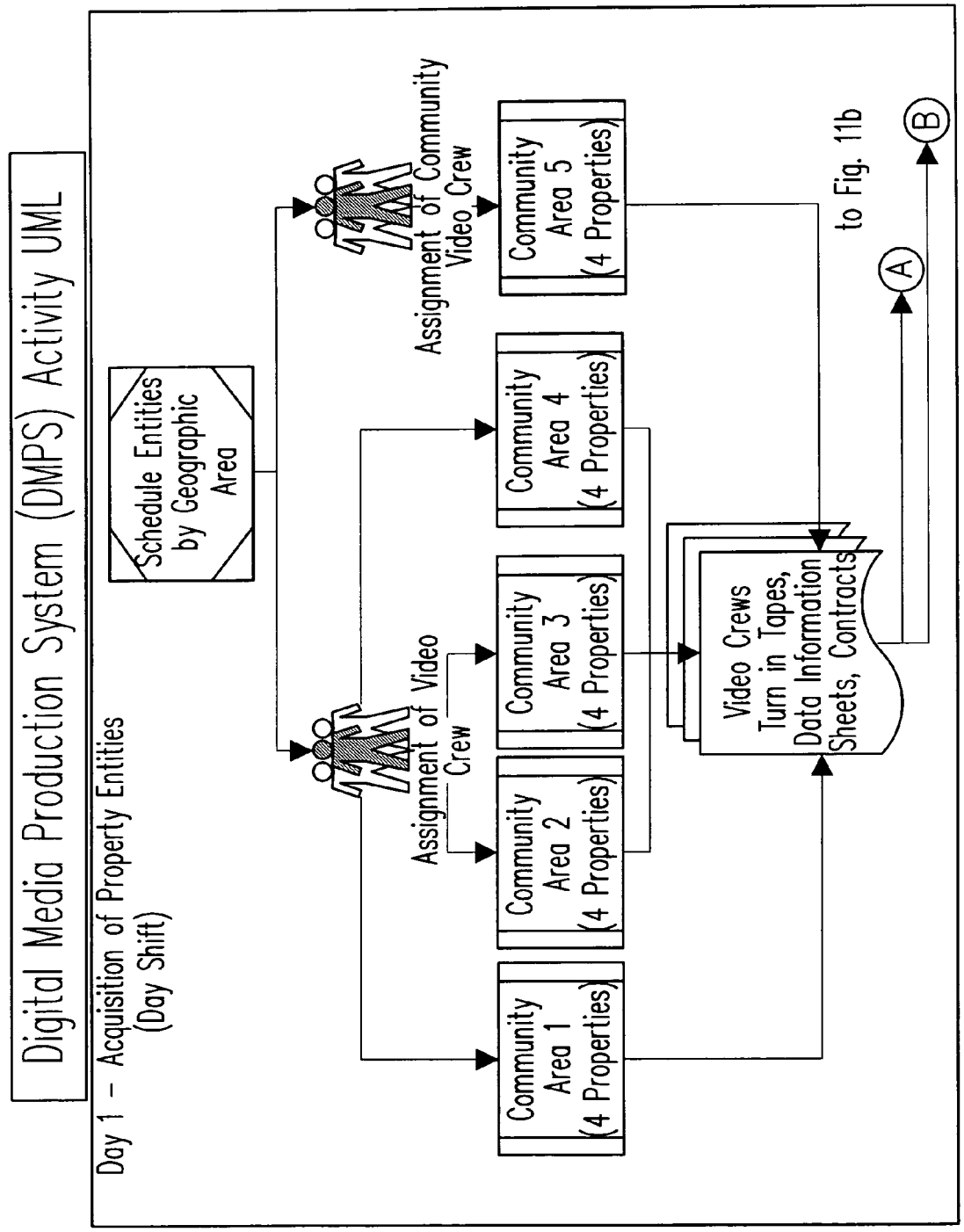
FIG. 11a is a flowchart of a first portion of a fifth preferred computer process for digital media production activity according to the present invention.
Figure 11B:
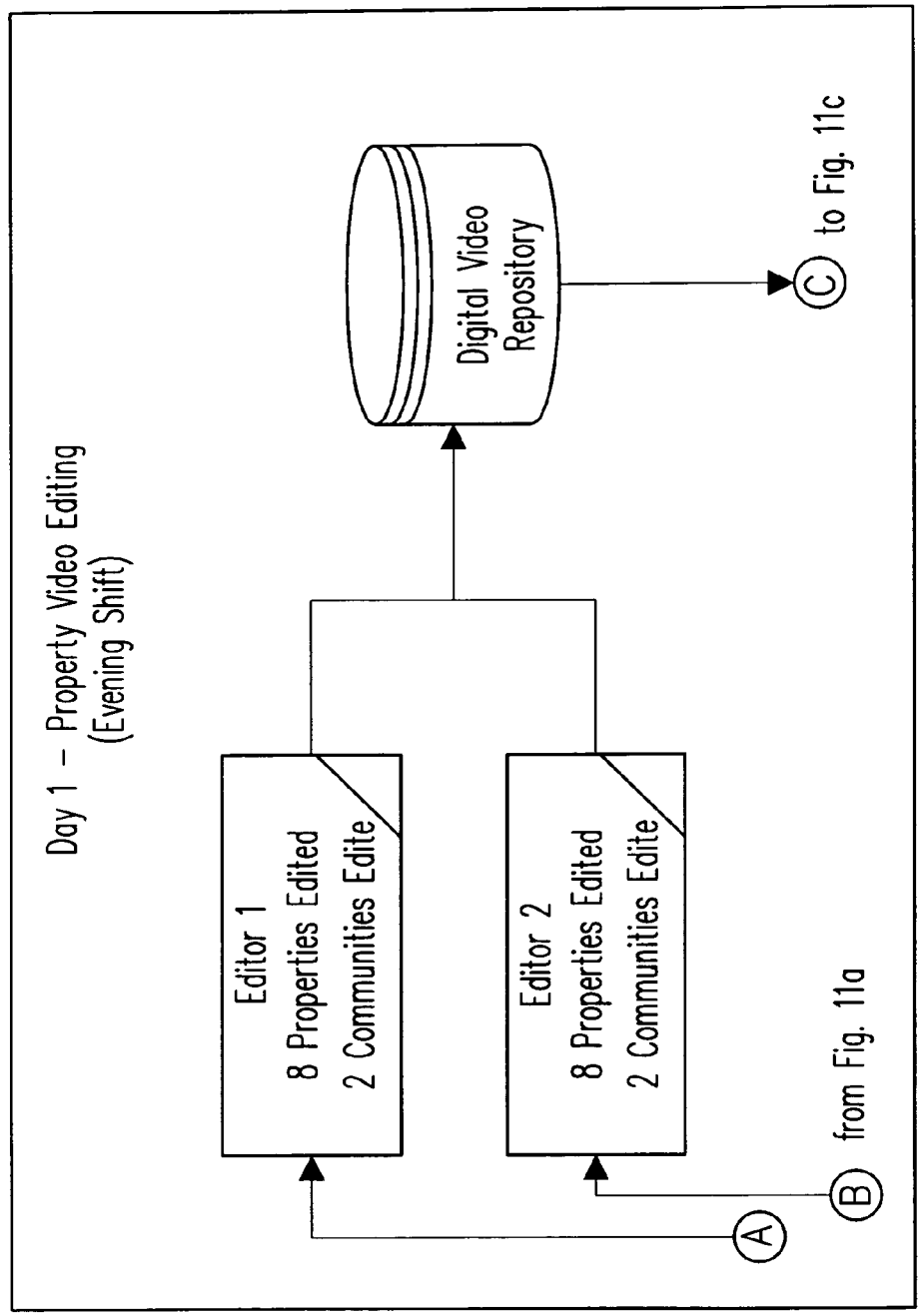
FIG. 11b is a flowchart of a second portion of the fifth preferred computer process for digital media production activity according to the present invention.
Figure 11C:
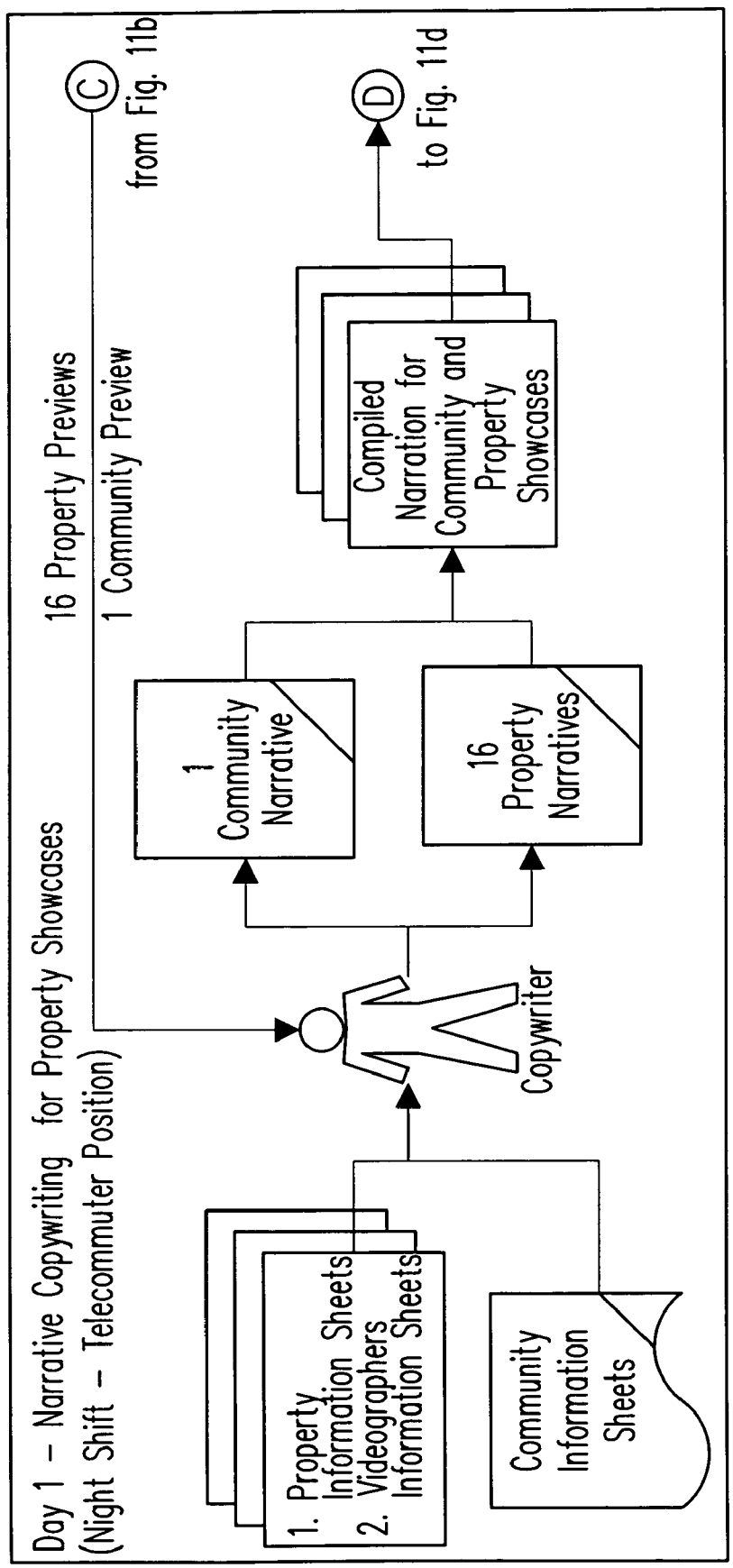
FIG. 11c is a flowchart of a third portion of the fifth preferred computer process for digital media production activity according to the present invention.
Figure 11D:
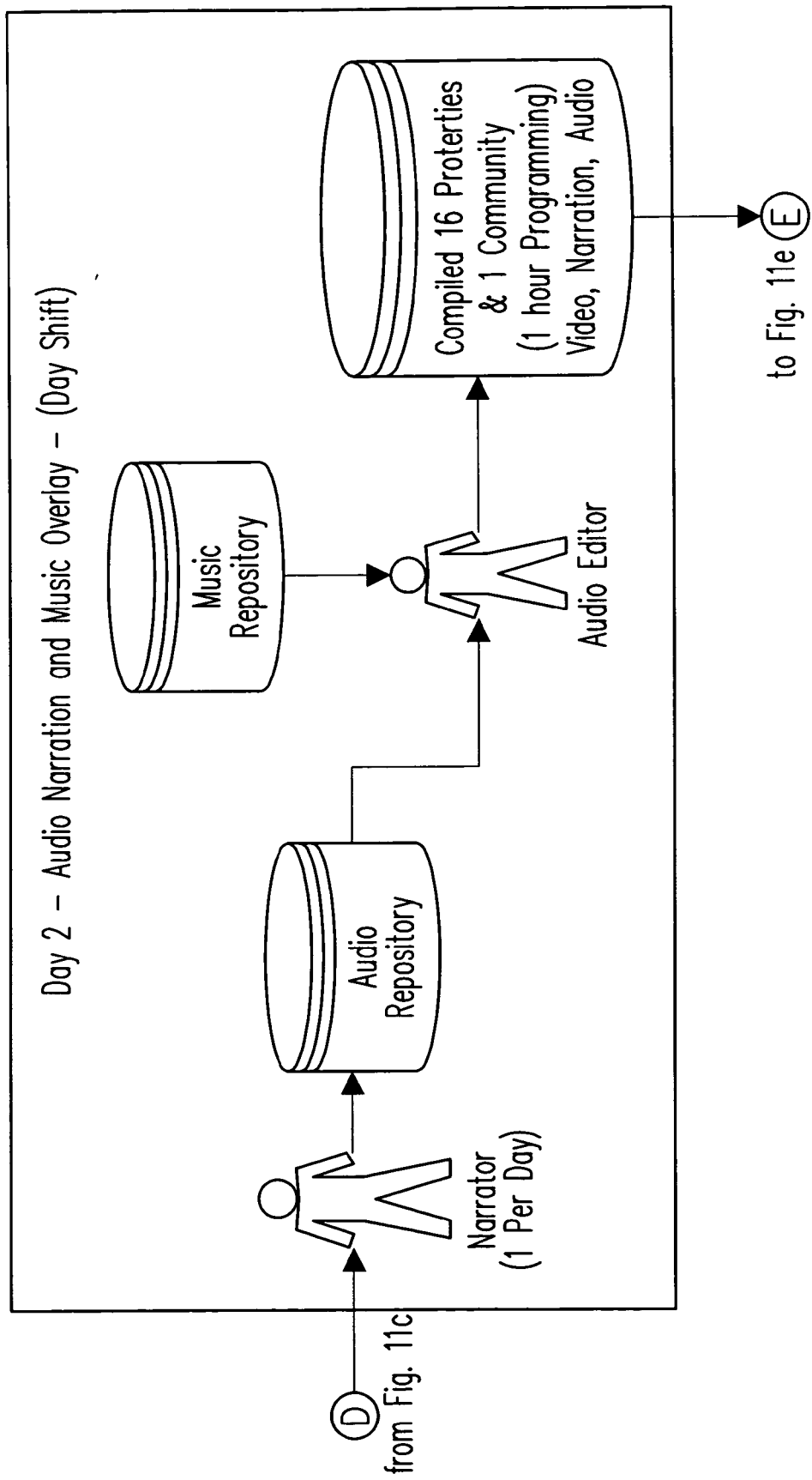
FIG. 11d is a flowchart of a fourth portion of the fifth preferred computer process for digital media production activity according to the present invention.
Figure 11E:
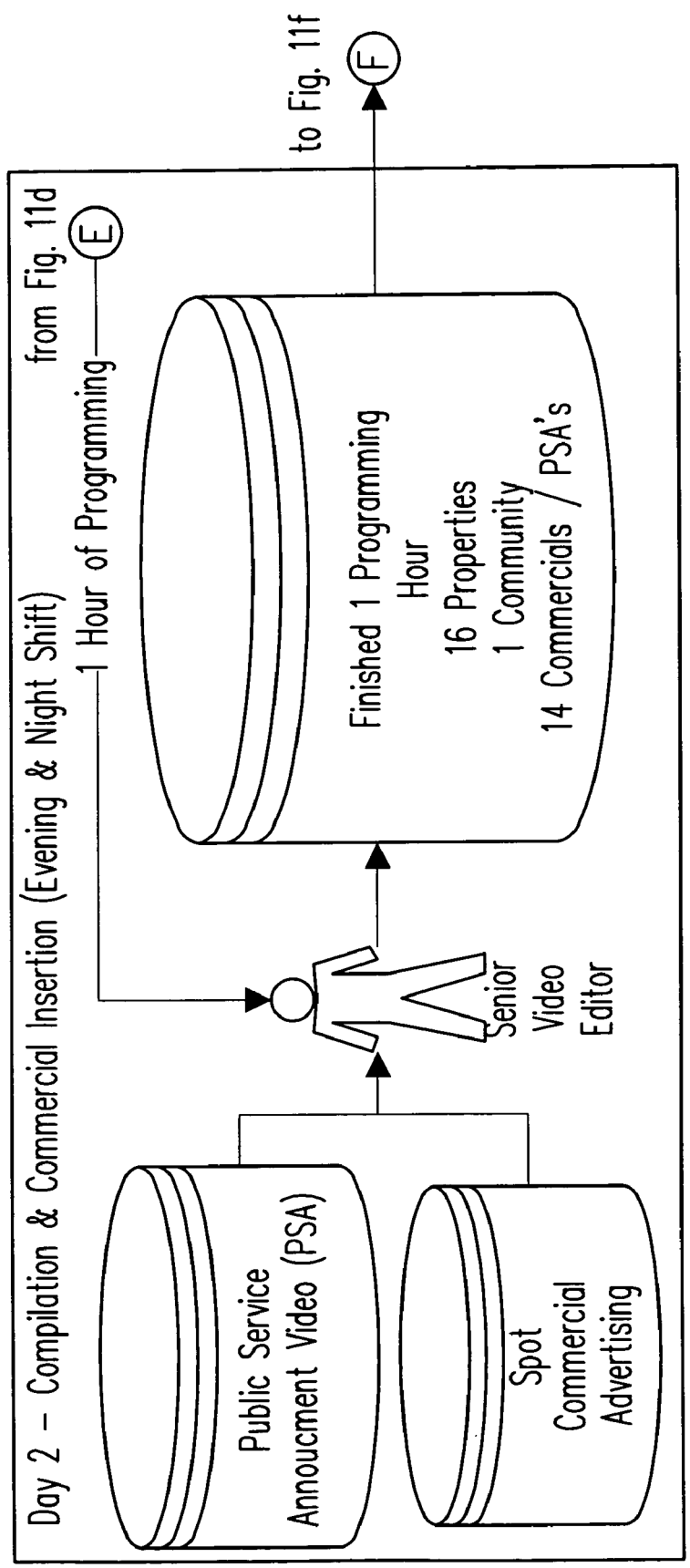
FIG. 11e is a flowchart of a fifth portion of the fifth preferred computer process for digital media production activity according to the present invention.
Figure 11F:
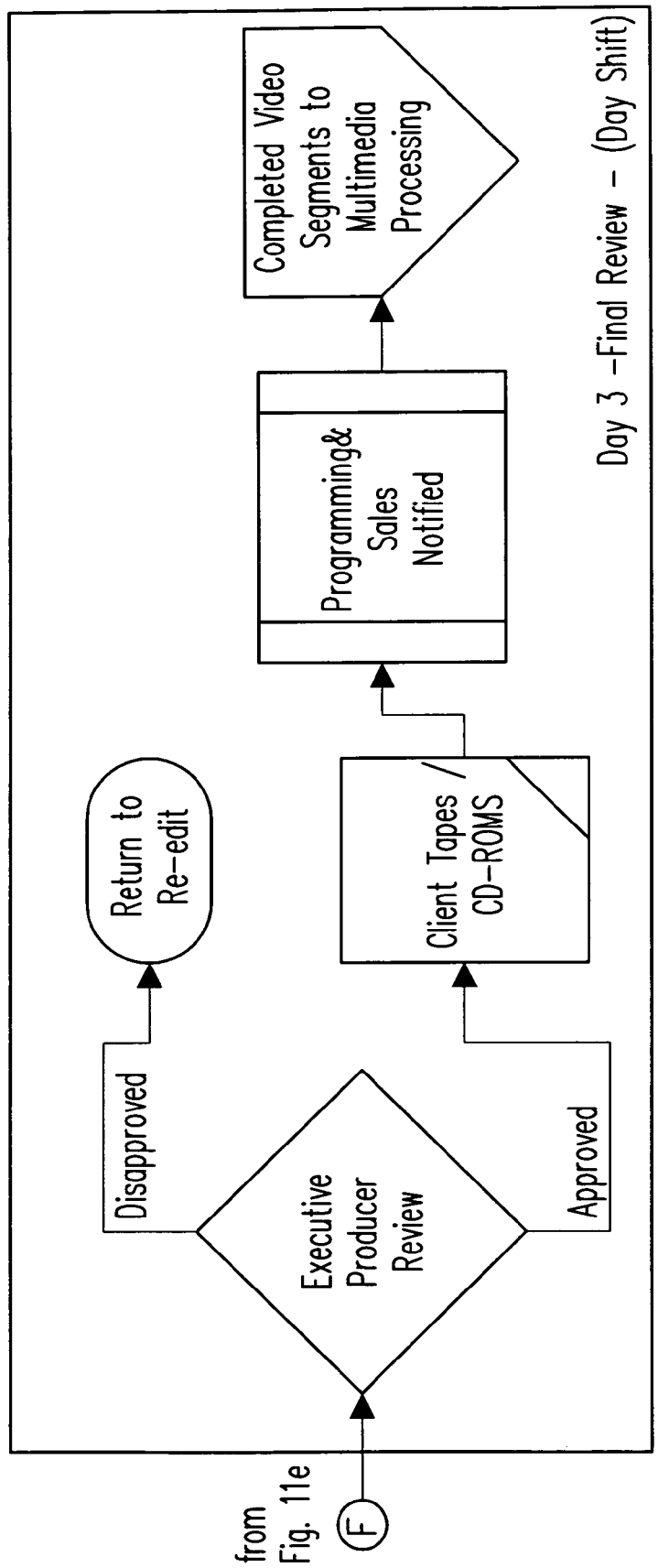
FIG. 11f is a flowchart of a sixth portion of the fifth preferred computer process for digital media production activity according to the present invention.
Figure 12:
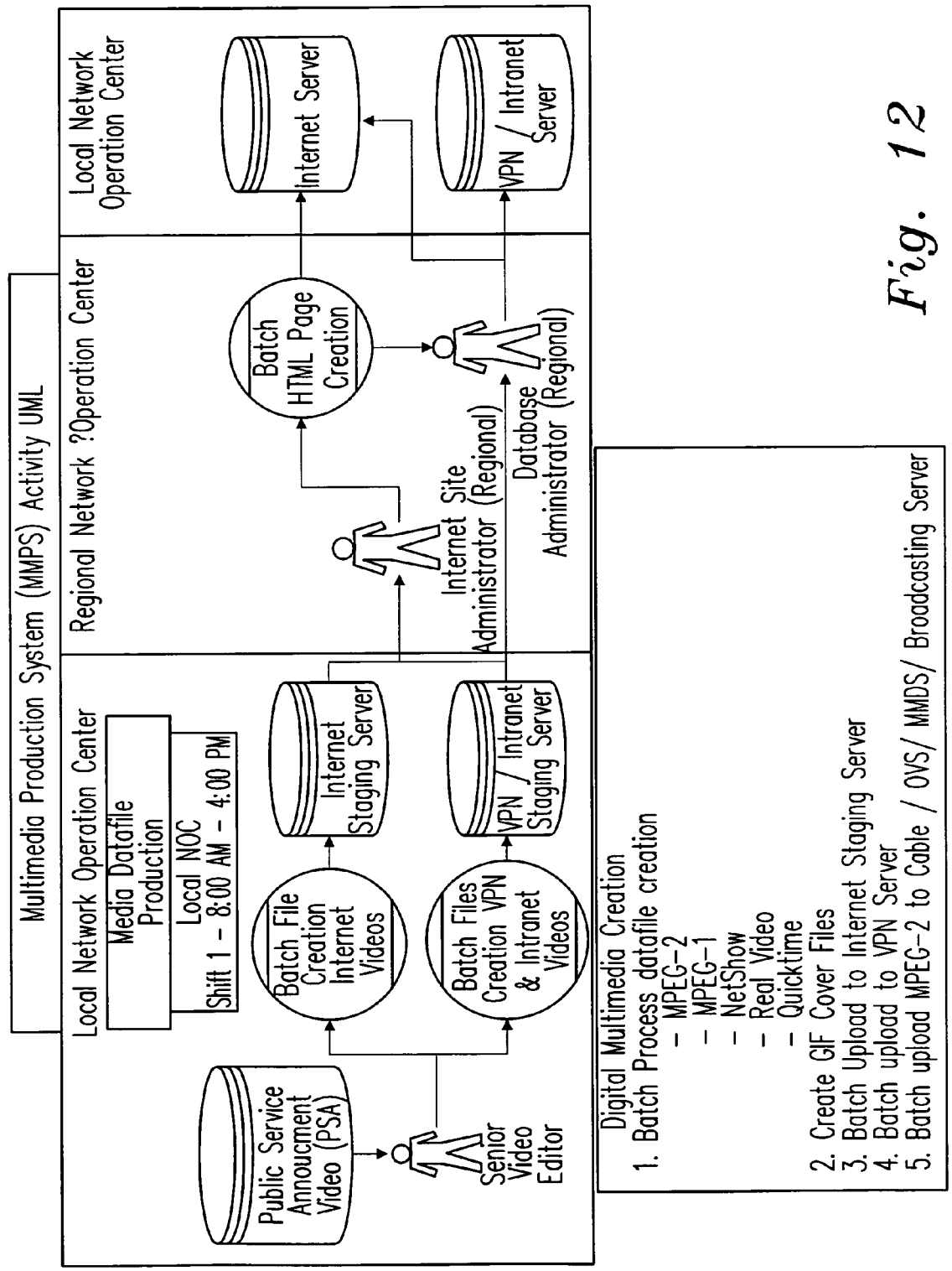
FIG. 12 is a flowchart of a sixth preferred computer process for a multimedia production system according to the present invention.
Figure 13:
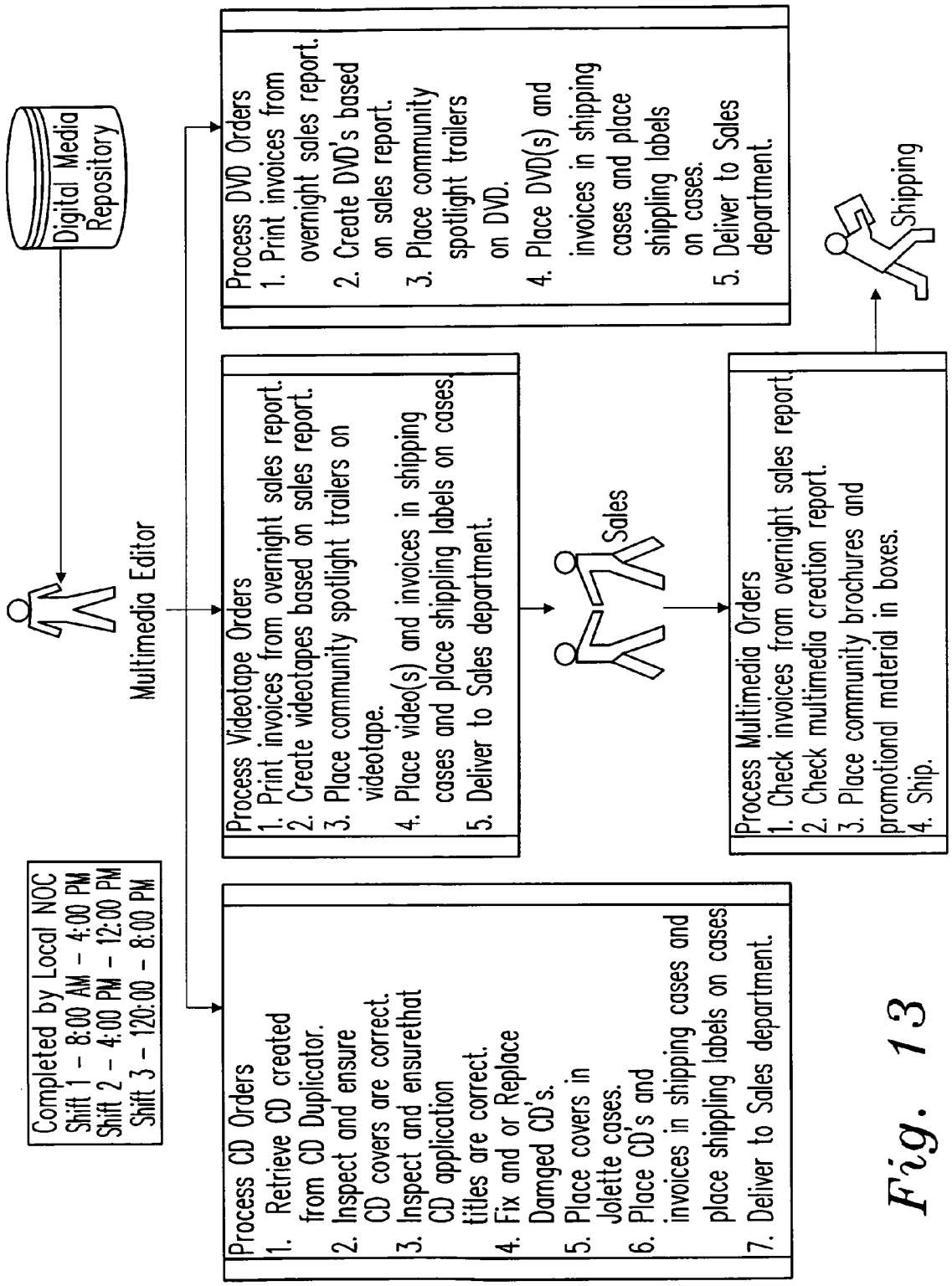
FIG. 13 is a flowchart of a seventh preferred computer process for multimedia sales activity.
Figure 14:
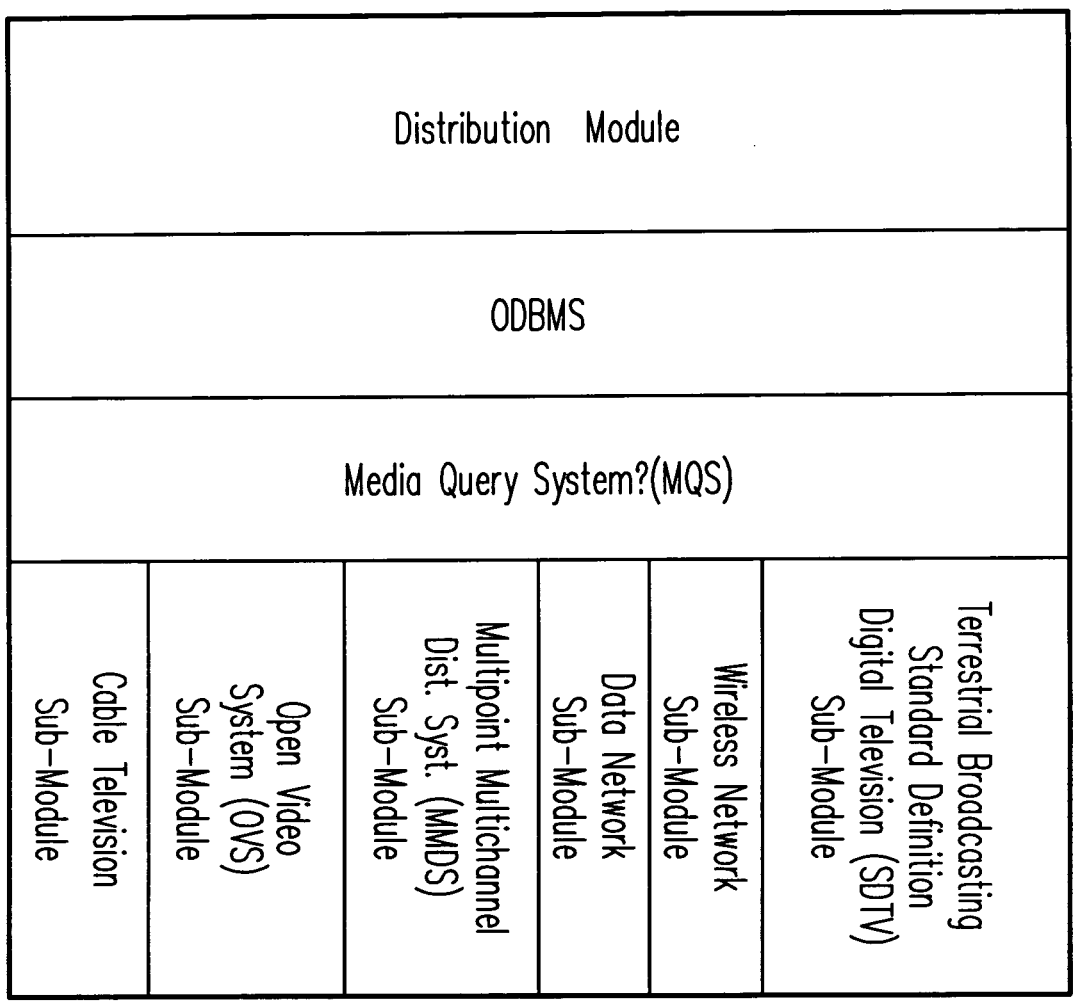
FIG. 14 is an illustration of a distribution module according to the present invention.

Acquisition Module. The acquisition module 16 consists of three sub-modules consisting of the ODBMS 22, the shared GIS application 24, and equipment 30 defined in a geographic specific Digital Media Acquisition System (DMAS) (not shown). DMAS equipment includes a Geospatial Media Recorder (GMR) 32 central receiving station on each mobile DMAS system, local receivers that receive GMR information from the GMR 32 central receiving system, and a GMR video encoder (not shown) that is retrofitted for use on all digital media acquisition camcorders. The GMR video encoder (not shown) places on each frame of video, geospatial data. The GMR video encoder (not shown) uses specialized electronic circuitry that is connected to a camcorders lens focus ratio apparatus to provide relative geographic positioning based on the camcorder's focused field of vision. This relative position of the camcorder's focused field of vision is then interpreted through the GMR video encoder (not shown) and the geospatial data of the viewed image is encoded on to each individual video frame. The encoding of geospatial data is placed on an available data track of the video frame depending on the video recorder in use. DMAS system equipment can be interchanged with other digital media acquisition equipment based on geographic area and/or technical specifications of media development. This flexibility provides for the inclusion of advanced digital video formats required when available. The activity UML used in the acquisition module is at FIG. 9.

Production Module. The production module 18 has three sub-modules that include the shared ODBMS 22, a digital media production system (hereinafter referred to as DMPS) 36, and a multimedia production system (hereinafter referred to as MMPS) 38. The third shared DMPS 36 uses native digital media editing and production equipment and MPEG generators for MPEG digital media creation. The digital media equipment can be upgraded based on new capabilities that are released in future upgrades. The MMPS 38 uses a variety of equipment and selected multimedia creation software applications. The third shared DMPS 36 and MMPS 38 submodules automatically read GMR information into the shared ODBMS 22. For media that was not acquired through the DMAS, manual entry of GMR information will be entered into the shared ODBMS 22. For media that was not acquired through the DMAS (not shown), manual entry of GMR information will be entered into the ODBMS 22. Each module has information processing applications that have proprietary enhancements and provides seamless digital media development for any media distribution venue. Shown in FIGS. 11a–f are activity UMLs used in the production module.

Distribution Module. The distribution module 20 has two central proprietary submodules 40 and six plug-in submodules 42 that are geographic or distribution system dependent. The first one of the two central proprietary submodules 40 is the shared ODBMS 22. The second one of the two central proprietary submodules 40 is a media query system (MQS) 43. The six plug-in submodules consist of a terrestrial submodule 44, a cable system (CS) submodule 46, an open video system (OVS) submodule 48, a multipoint multichannel distribution system (MMDS) submodule 50, a wireless network submodule 52, and a data network submodule 53. The two central proprietary submodules 40 consist of six software applications to include the shared ODBMS 22, information exchange application (not shown), an Internet information application (not shown), Internet site creator application (not shown), media querying application (not shown) and XML parser (not shown). The six plug-in submodules 42 provide for connectivity services to different media outlets based on geographical area or distribution system requirements.

Shown in Table 1 is a list of equipment (or applications) that are used based on connectivity required by geographic area.

TABLE 1

Distribution Media Dataset Applications

| PLATFORM | EQUIPMENT TERRES. BROADCSTNG | APPLICATIONS |
|---|---|---|
| Terrestrial Satellite | DSS | MPEG-2 |
| Terrestrial DTV | Multichannel SDTV | MPEG-2 |
| Terrestrial Digital Datacasting | Multichannel DTV | MPEG-1 Active-X, Netshow, Quicktime, Real Video |
| Cable Television/Open Video System/MMDS | | |
| Cable System | MPEG Transporter | MPEG-2 |
| OVS | MPEG Transporter | MPEG-2 |
| MMDS | MPEG Transporter | MPEG-2 |
| Wireless | | |
| Wireless | Hybrid | Active-X, VFW, MPEG-1 |
| Data Networks | | |
| VPN | ATM Services | MPEG-1 |
| Cable Modem/ATM (DSL) | Hybrid Network | MPEG-1 |
| Internet | ATM Services | Active-X, Netshow, Quicktime, Real Video |

Figure 15A:
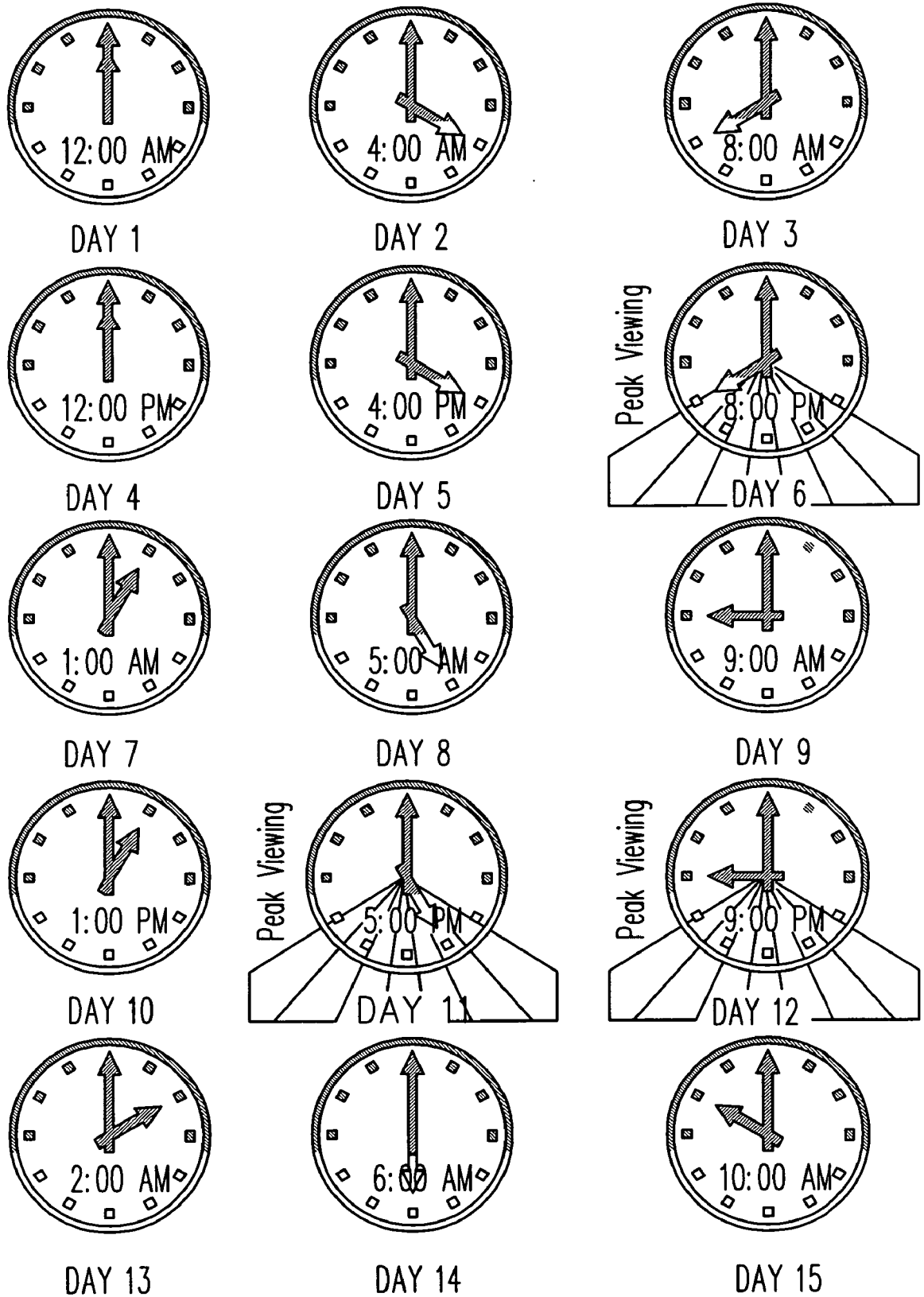
FIG. 15a is an illustration of a first portion of a preferred rotated programming format according to the present invention.
Figure 15B:
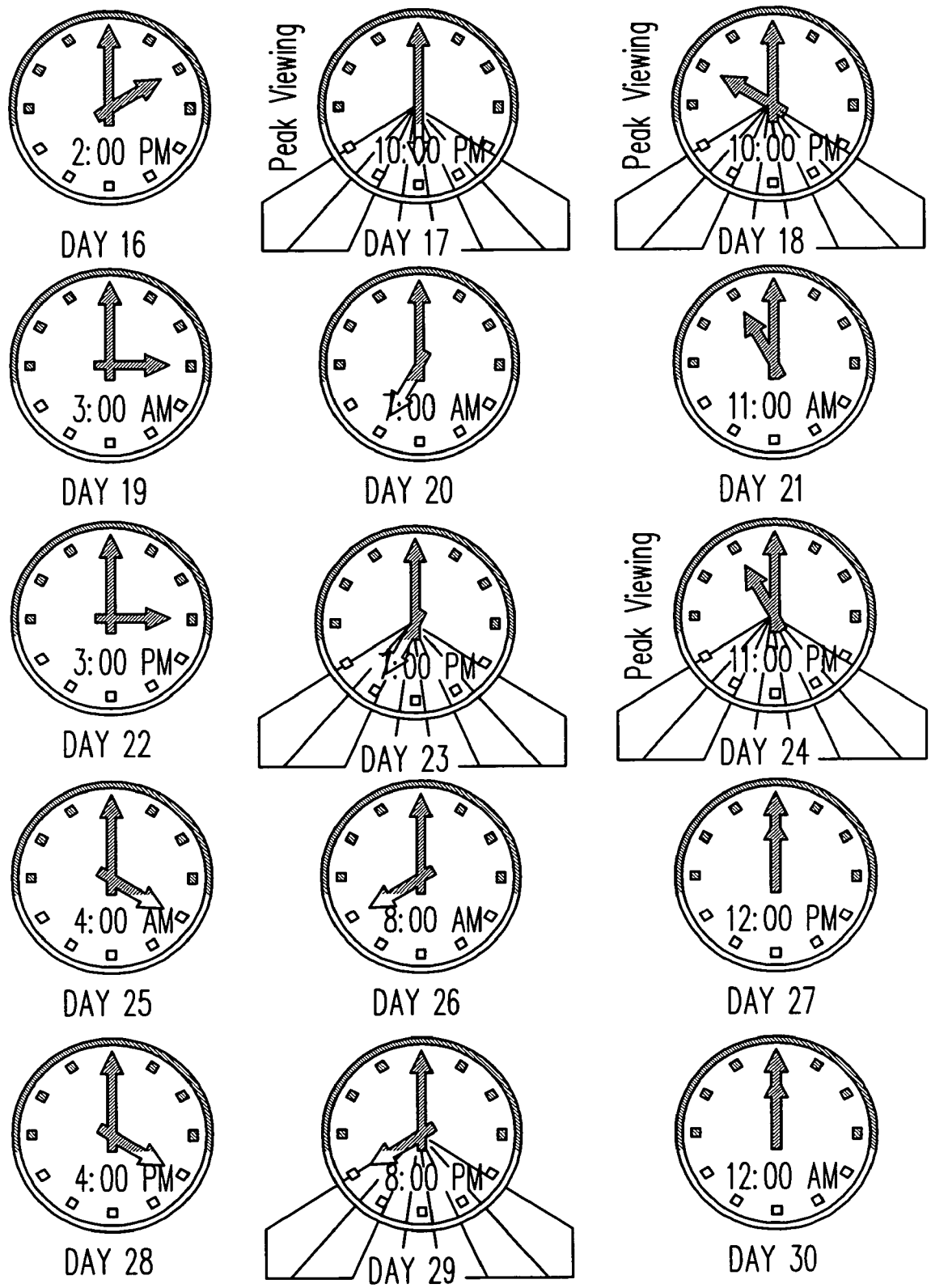
FIG. 15b is an illustration of a second portion of the preferred rotated programming format according to the present invention.
Figure 16:
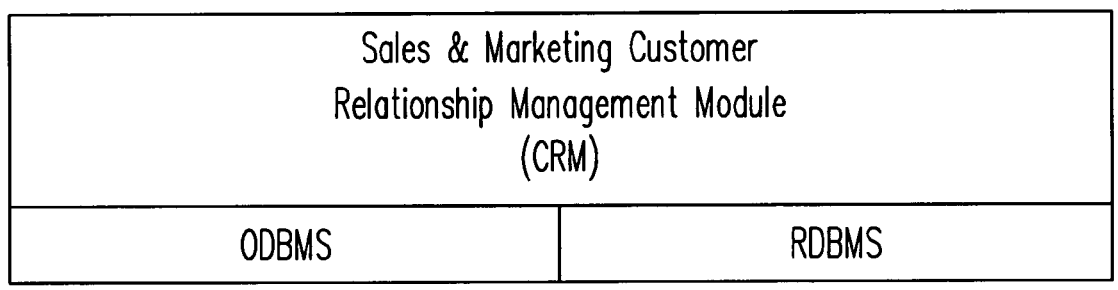
FIG. 16 is an illustration of a scheduling module according to the present invention.
Figure 17A:
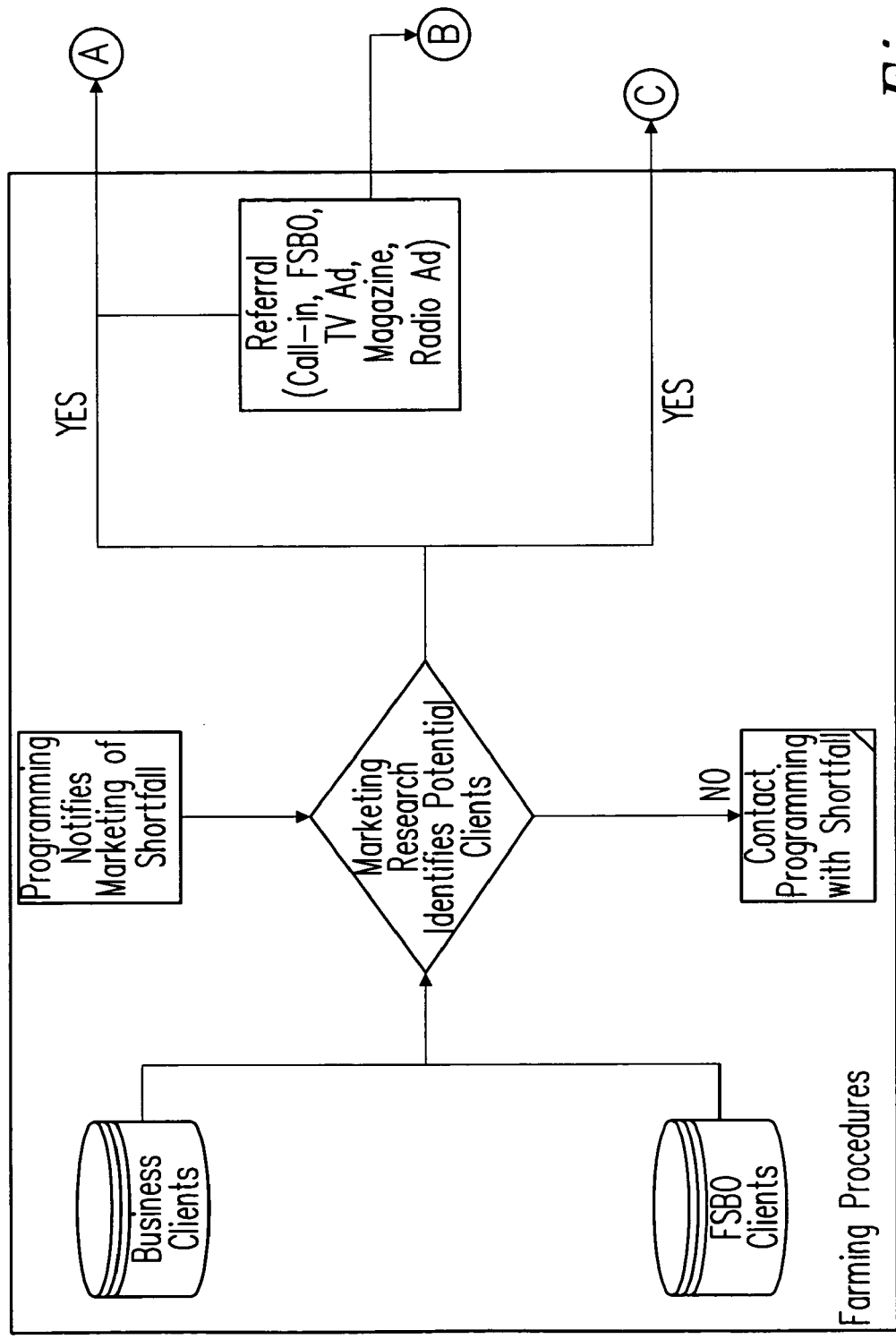
FIG. 17a is a flowchart of a first portion of an eighth preferred computer process for management of customer relations activity.
Figure 17B:
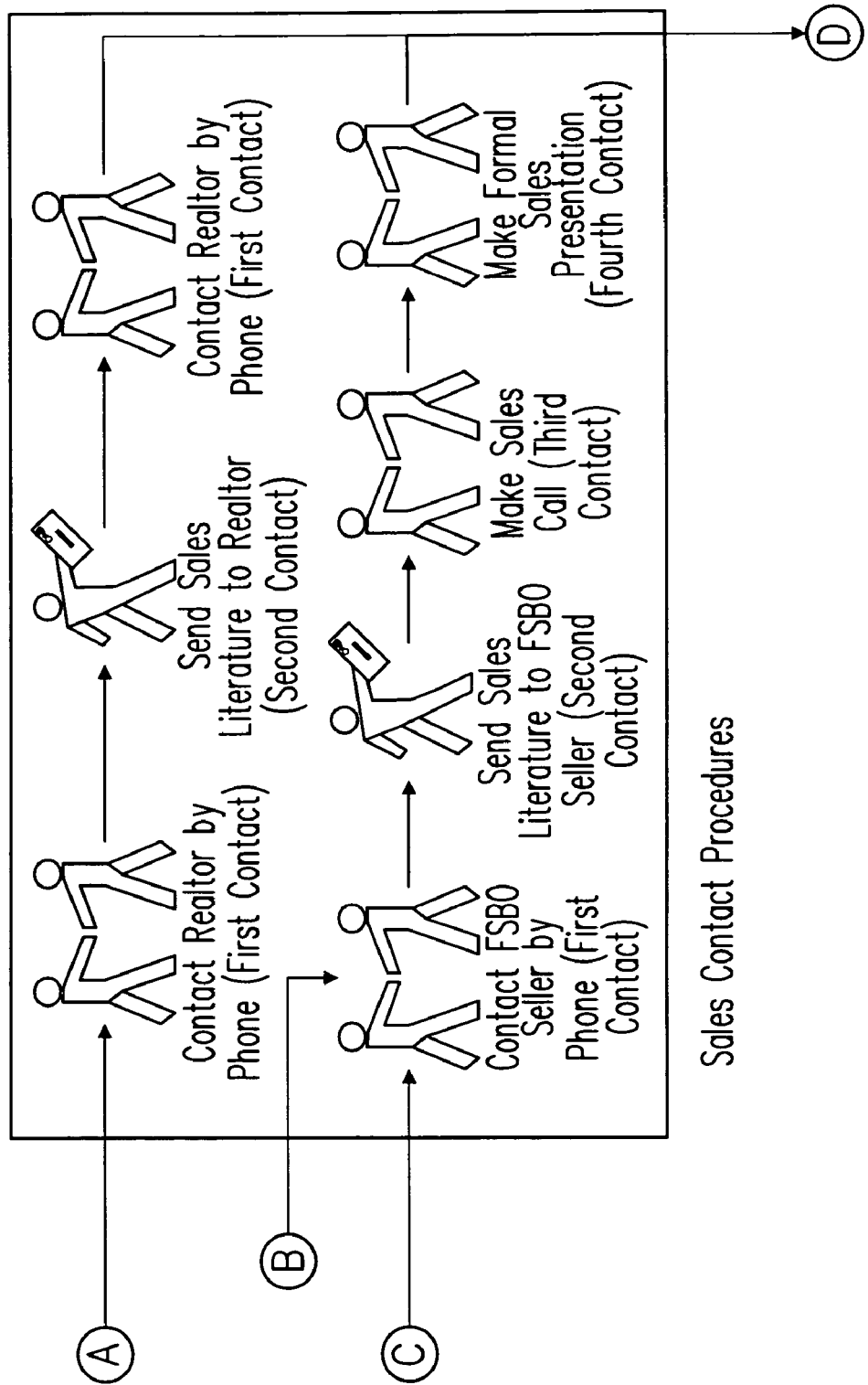
FIG. 17b is a flowchart of a second portion of the eighth preferred computer process for management of customer relations activity.
Figure 17C:
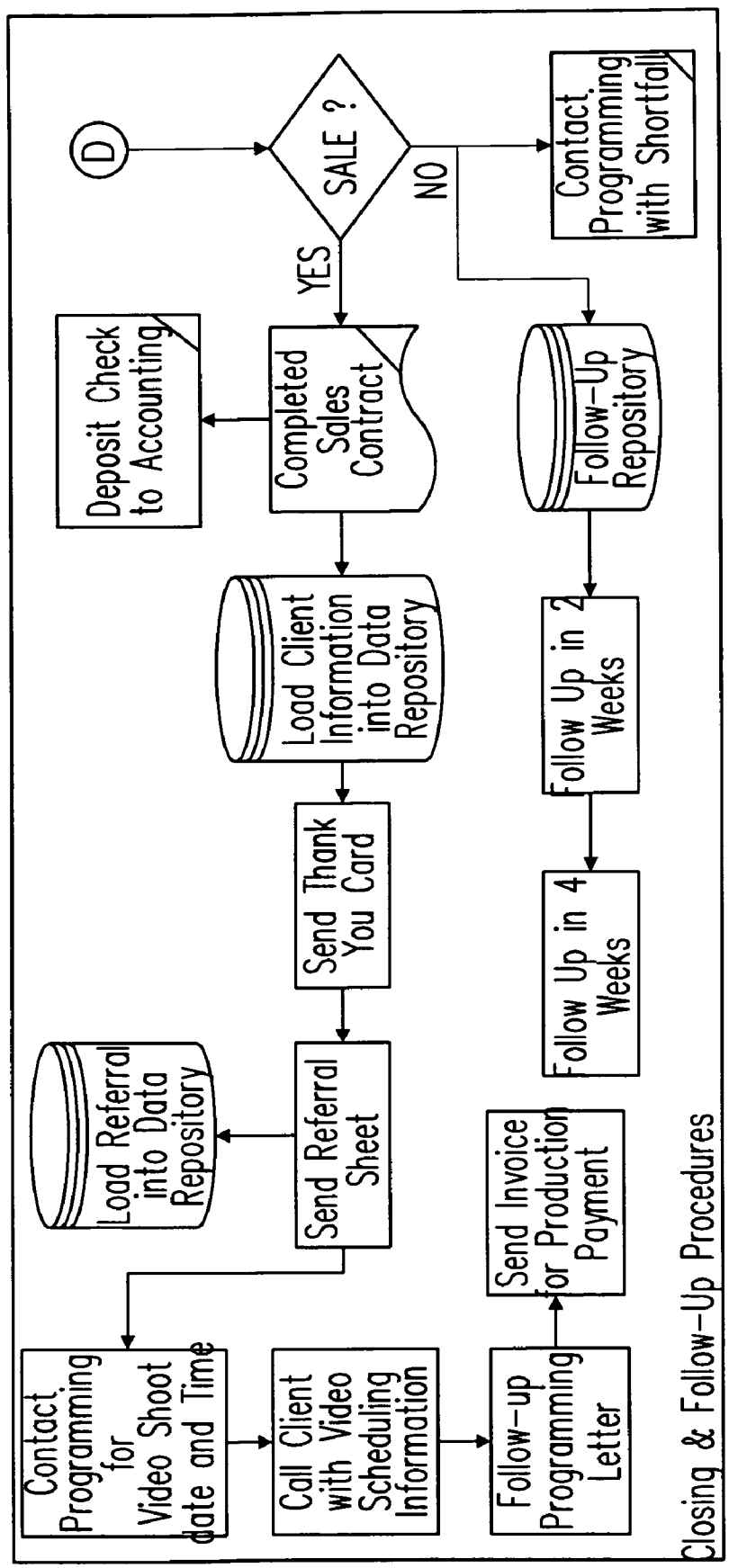
FIG. 17c is a flowchart of a third portion of the eighth preferred computer process for management of customer relations activity.
Figure 18A:
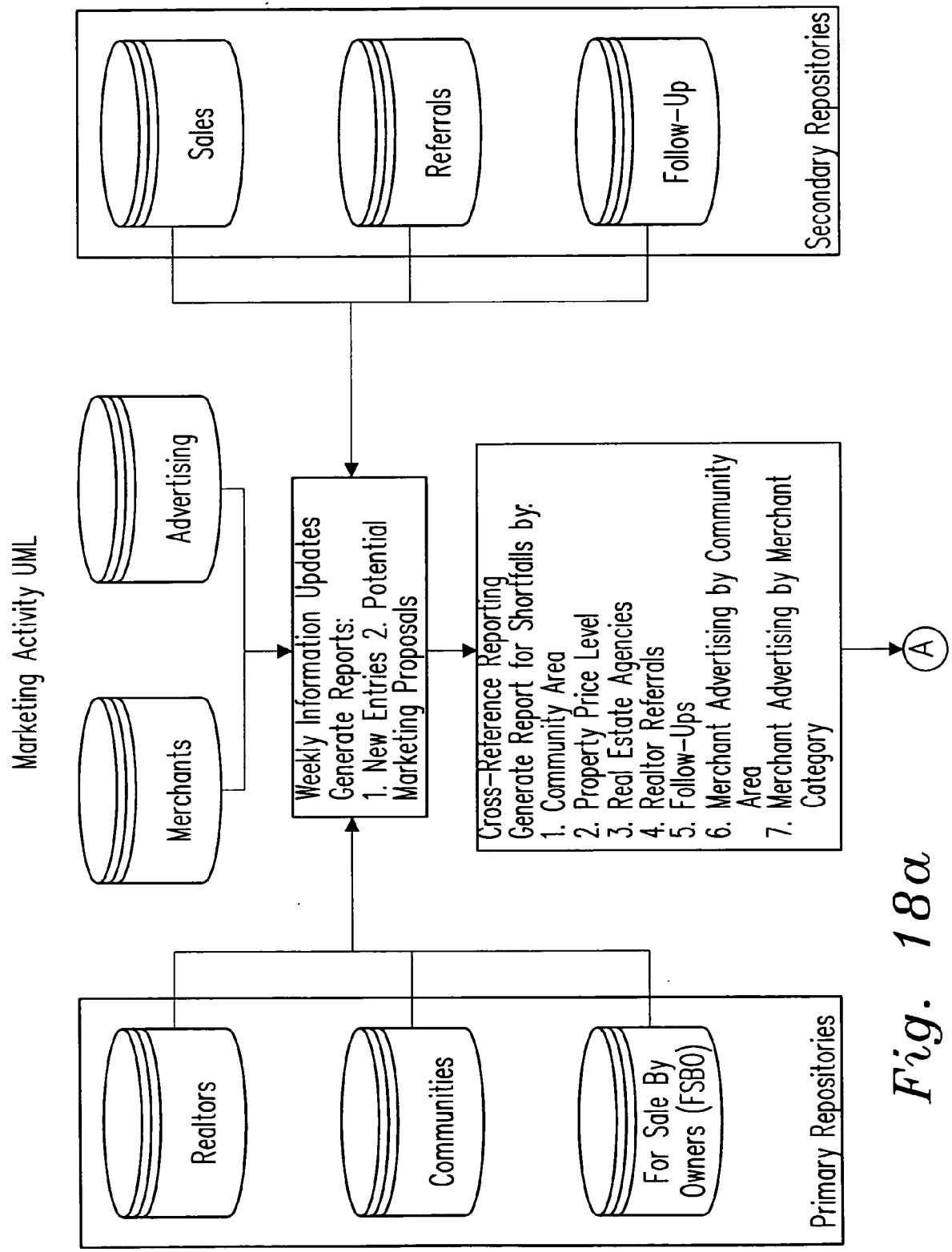
FIG. 18a is a flowchart of a first portion of a ninth preferred computer process for marketing activity according to the present invention.
Figure 18B:
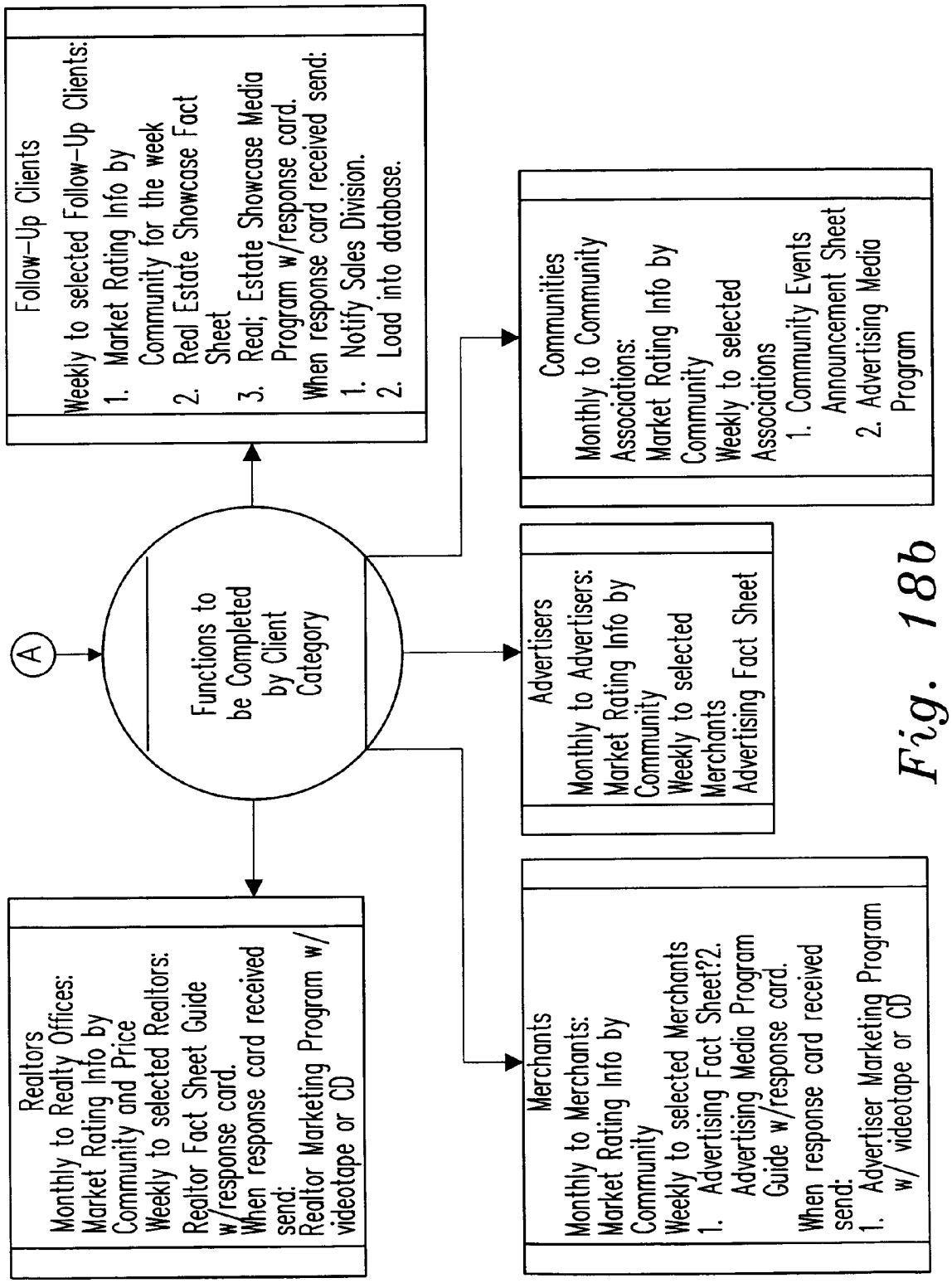
FIG. 18b is a flowchart of a second portion of the ninth preferred computer process for marketing activity according to the present invention.
Figure 19A:
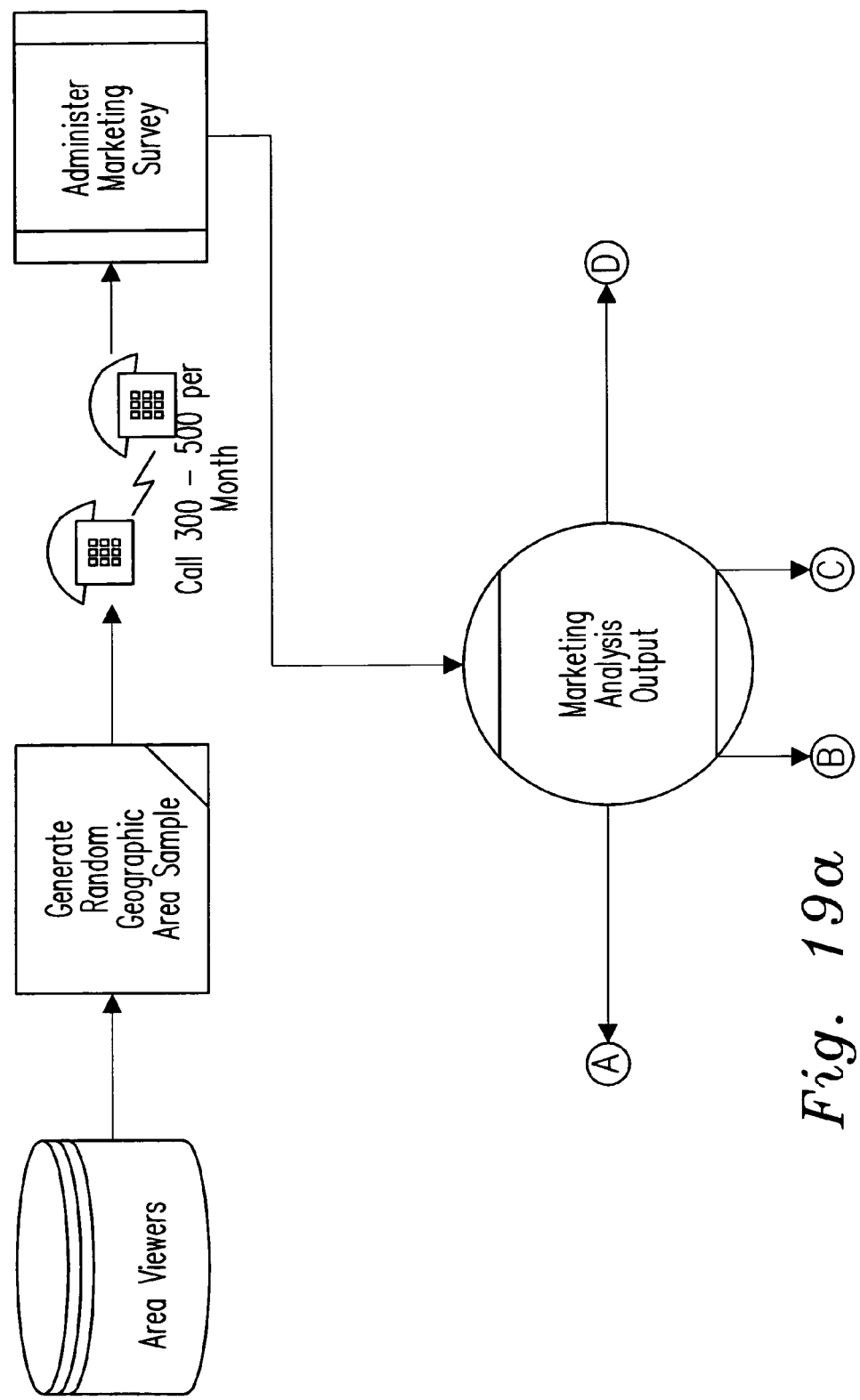
FIG. 19a is a flowchart of a first portion of a tenth preferred computer process for market rating analysis according to the present invention.
Figure 19B:
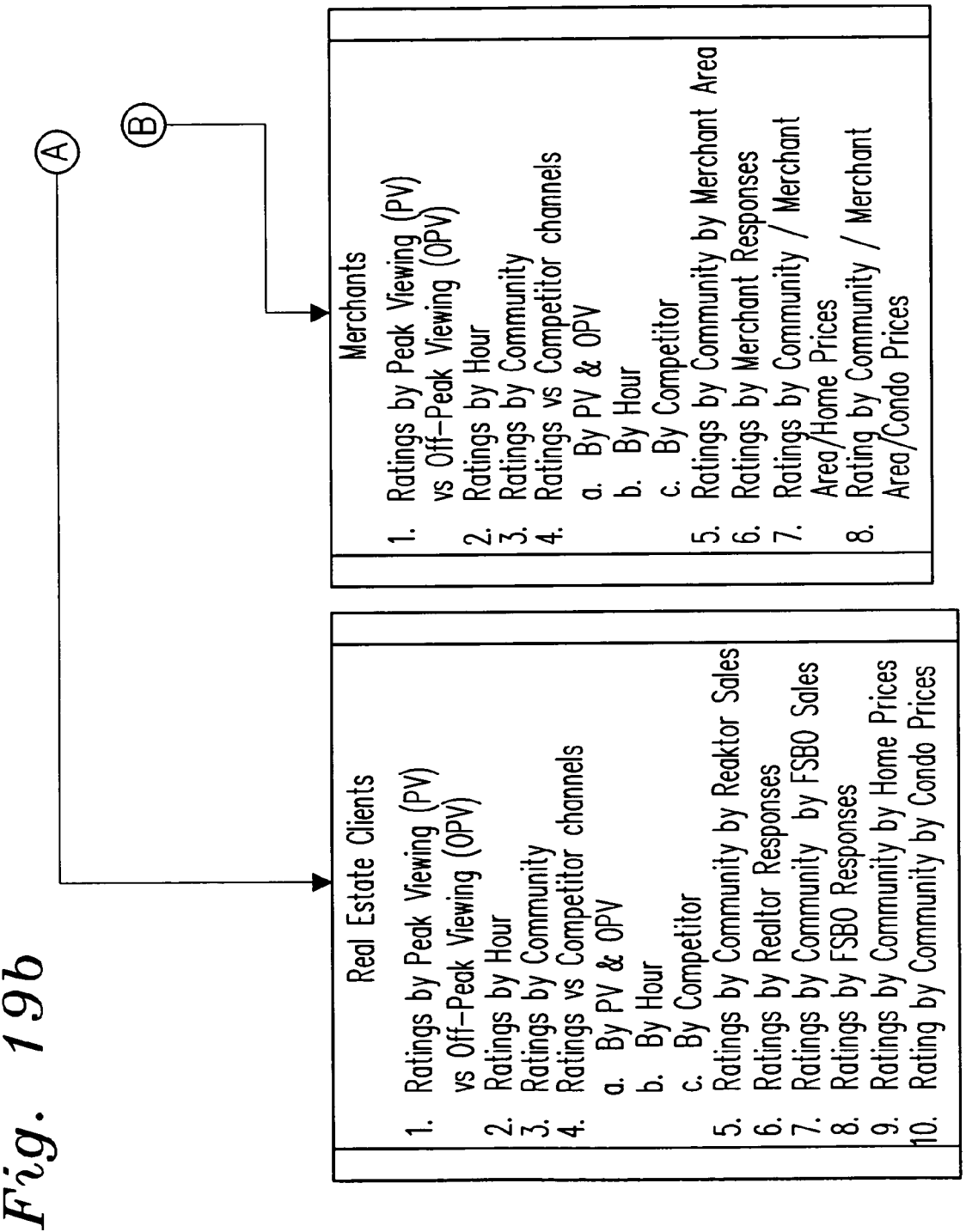
FIG. 19b is a flowchart of a second portion of the tenth preferred computer process.
Figure 19C:
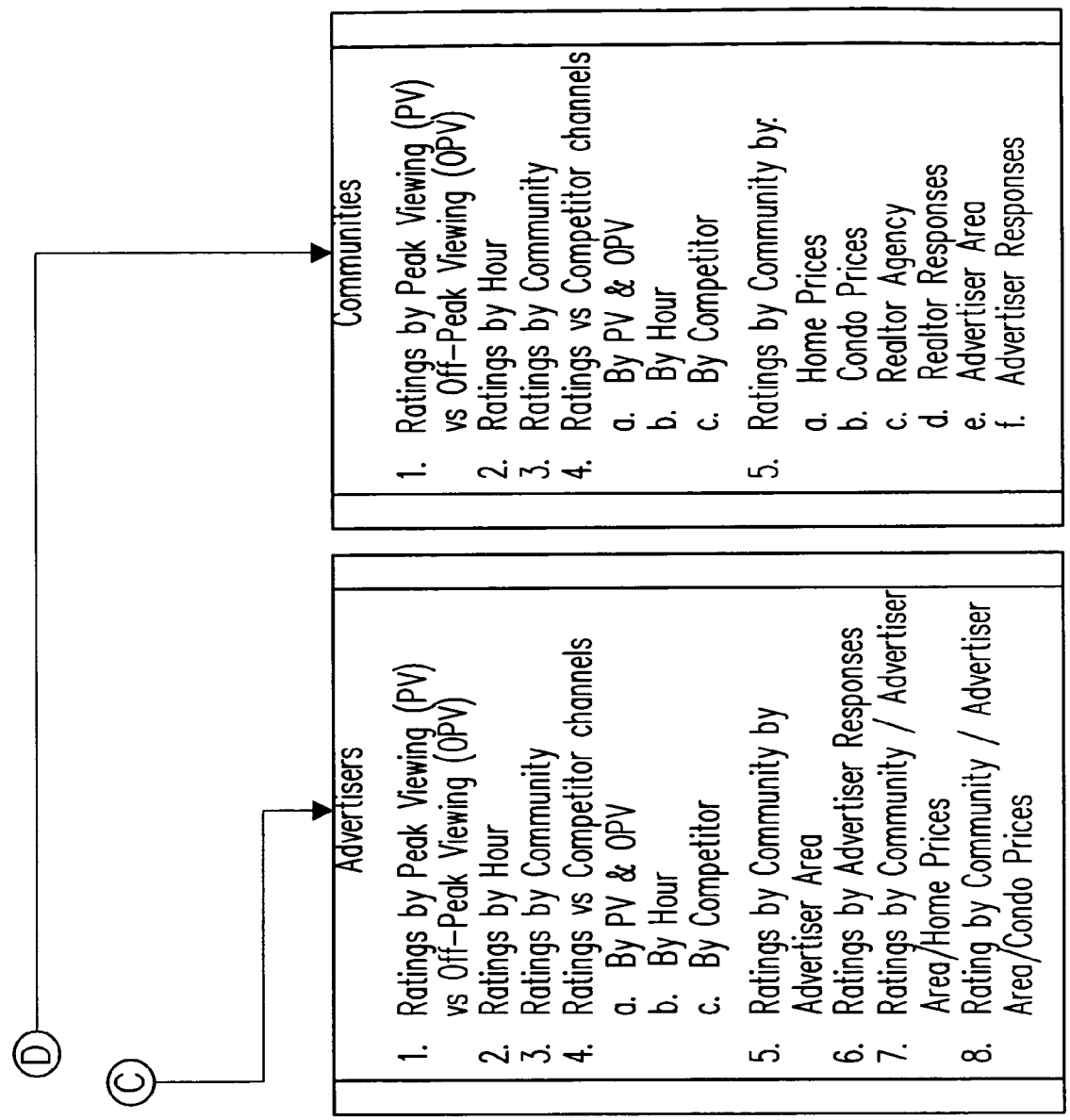
FIG. 19c is a flowchart of a third portion of the tenth preferred computer process.
Figure 20A:
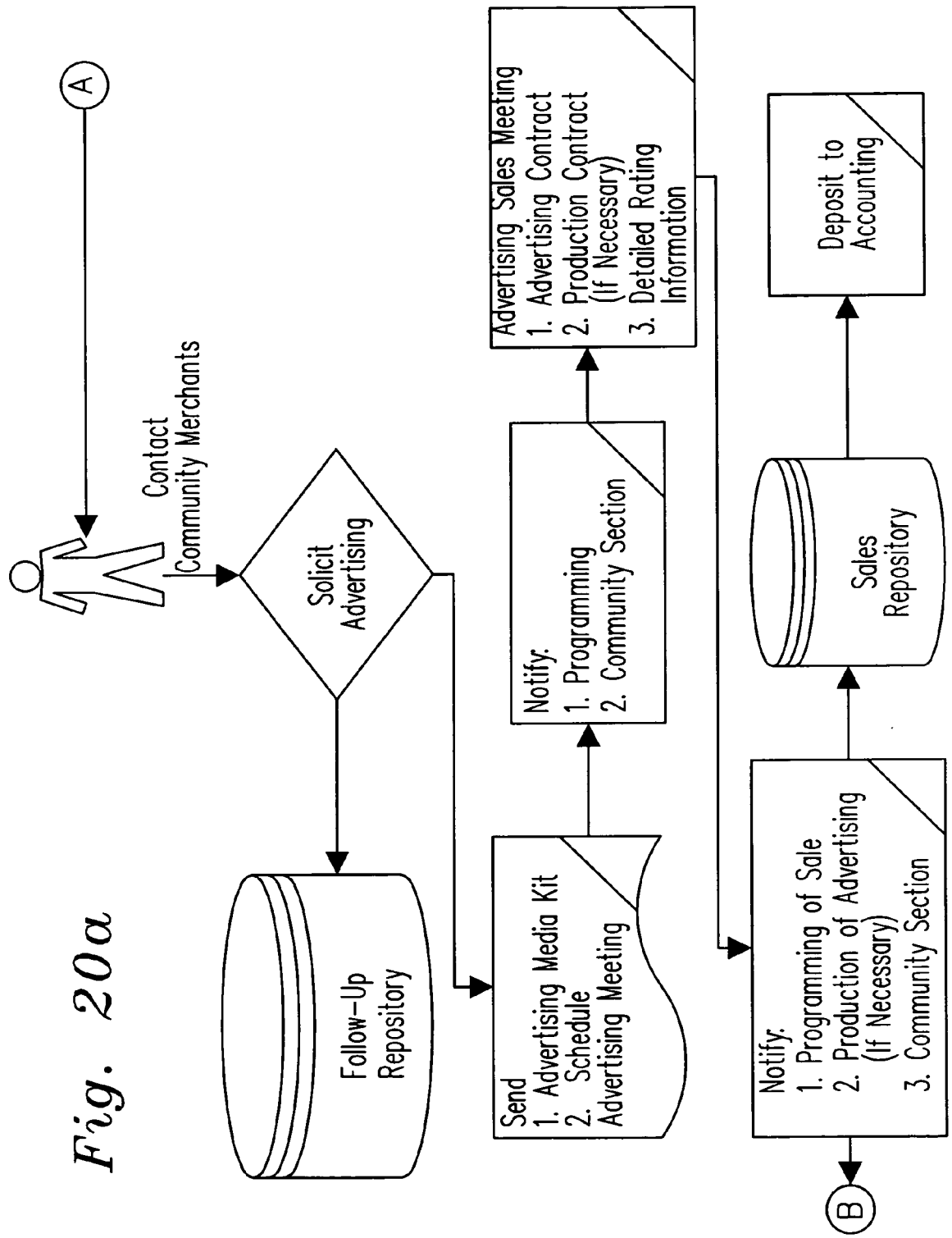
FIG. 20a is a flowchart of a first portion of an eleventh preferred computer process for community advertising according to the present invention.
Figure 20B:
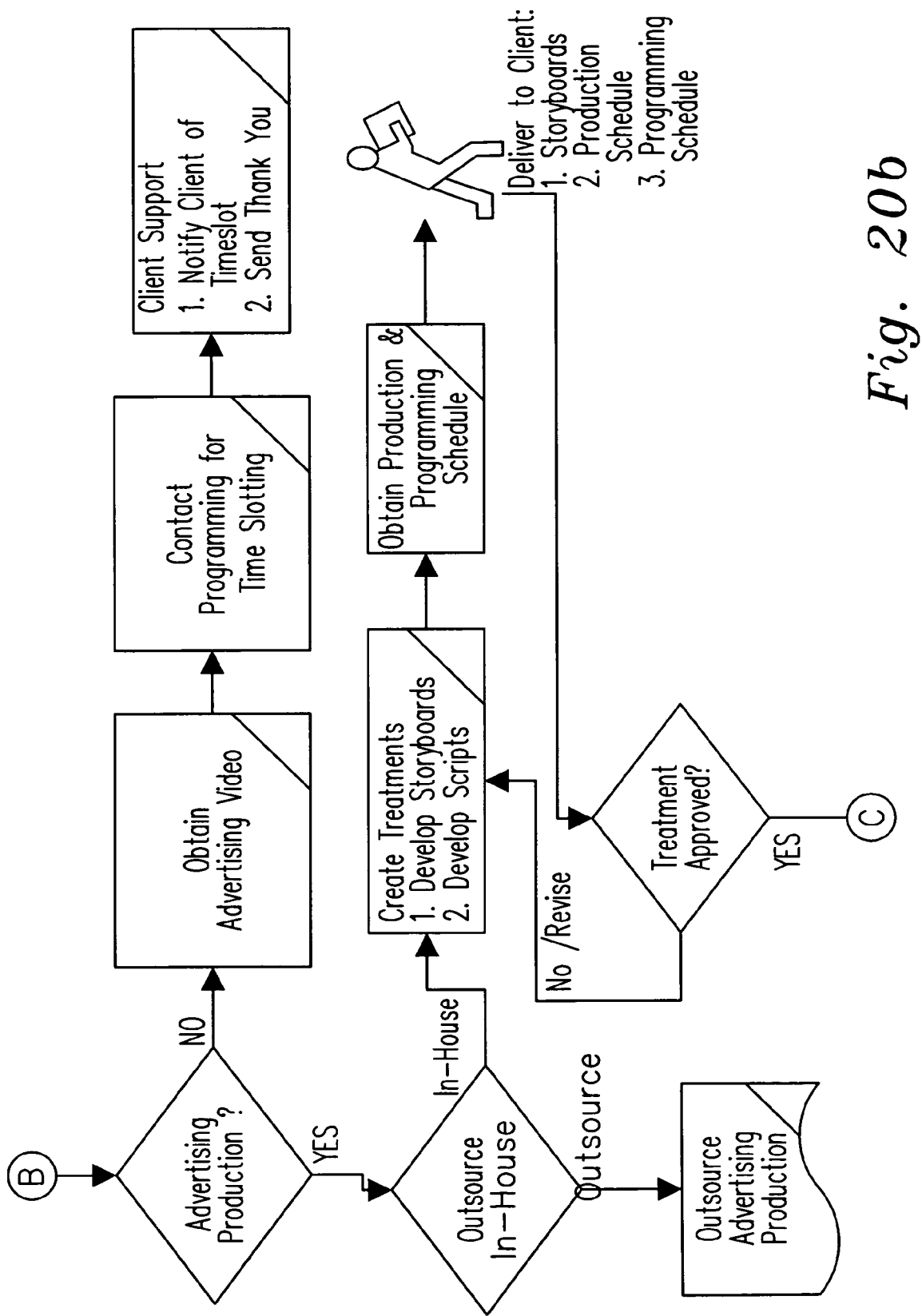
FIG. 20b is a flowchart of a second portion of the eleventh preferred computer process.
Figure 20C:
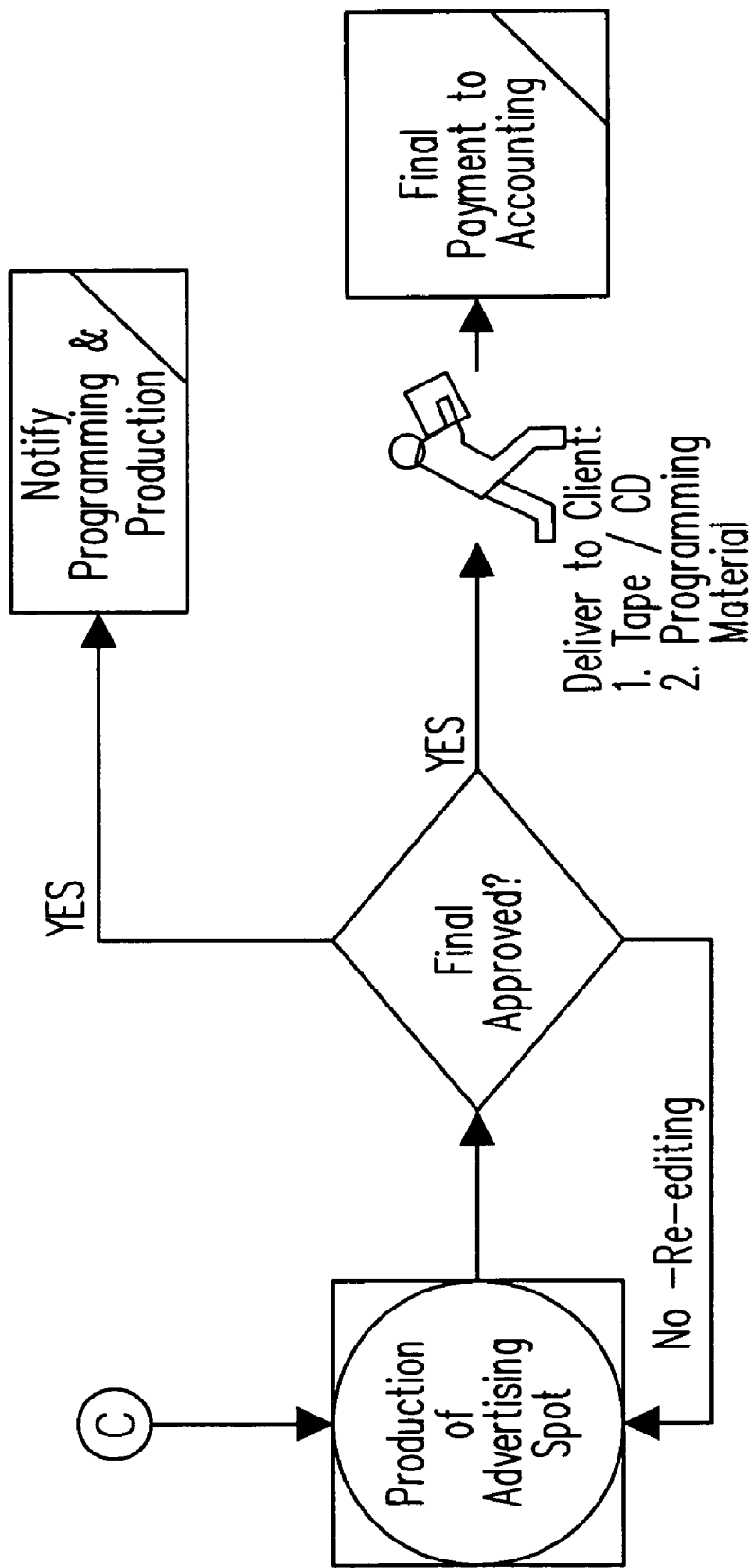
FIG. 20c is a flowchart of a third portion of the eleventh preferred computer process.
Figure 20D:
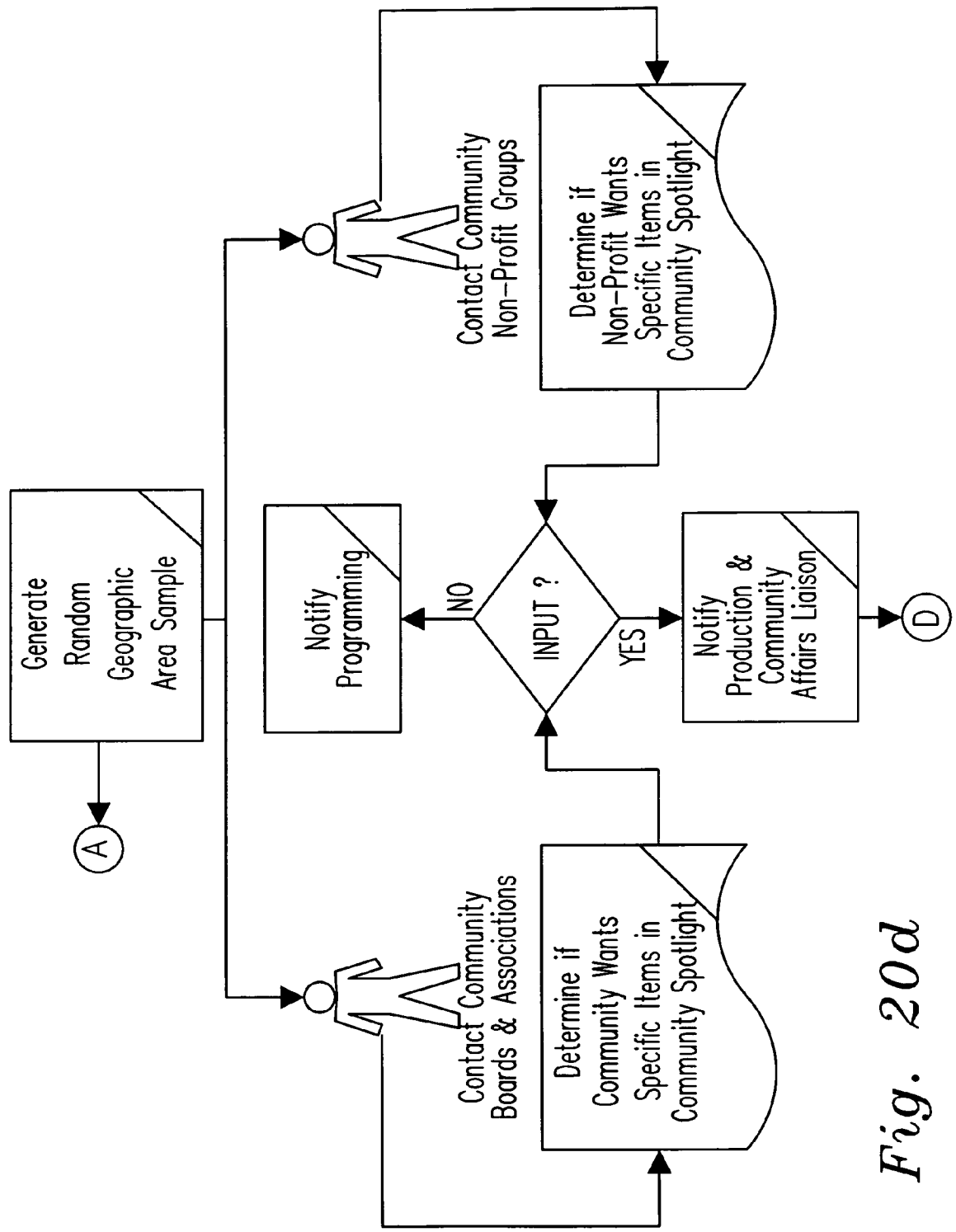
FIG. 20d is a flowchart of a fourth portion of the eleventh preferred computer process.
Figure 20E:
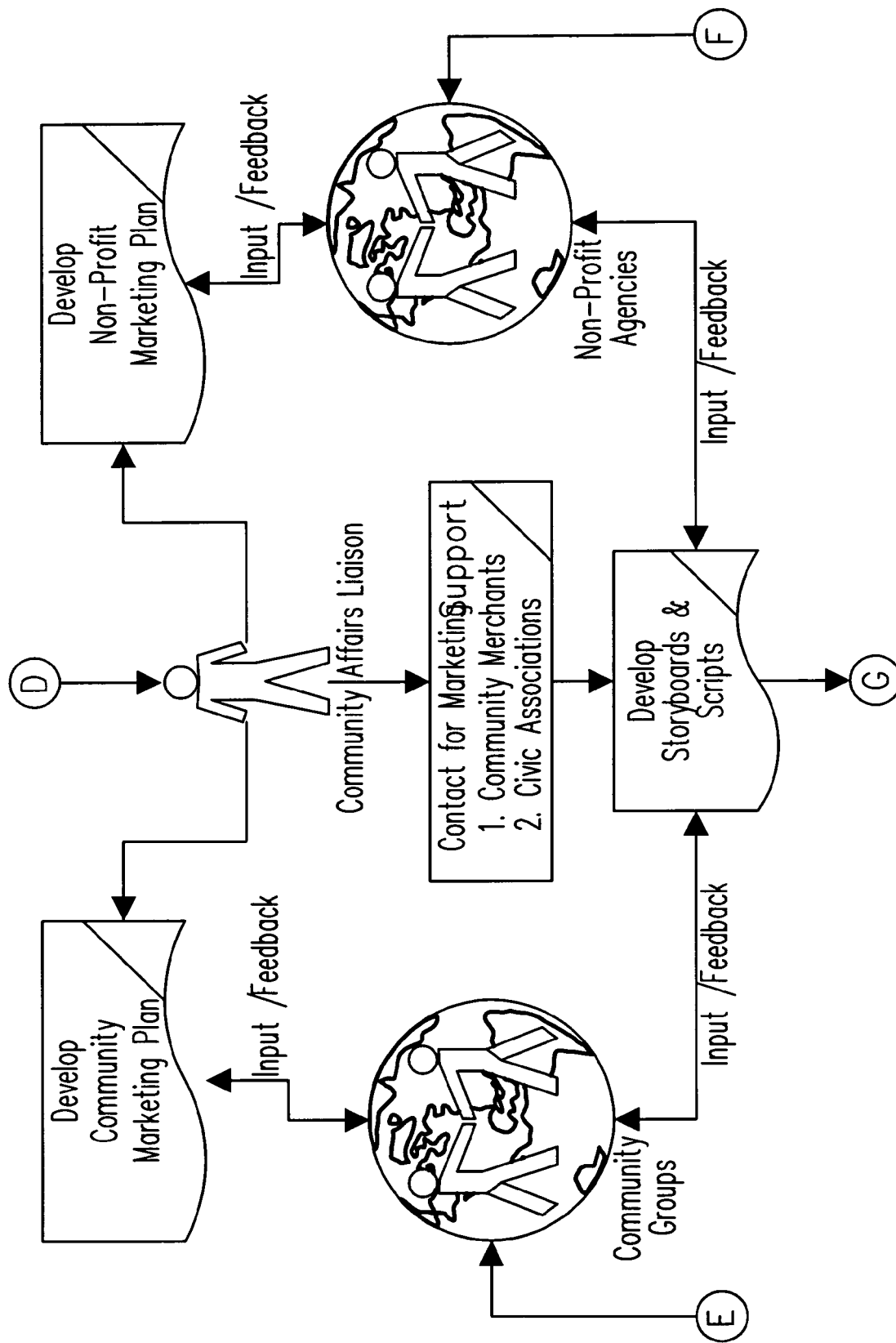
FIG. 20e is a flowchart of a fifth portion of the eleventh preferred computer process.
Figure 20F:
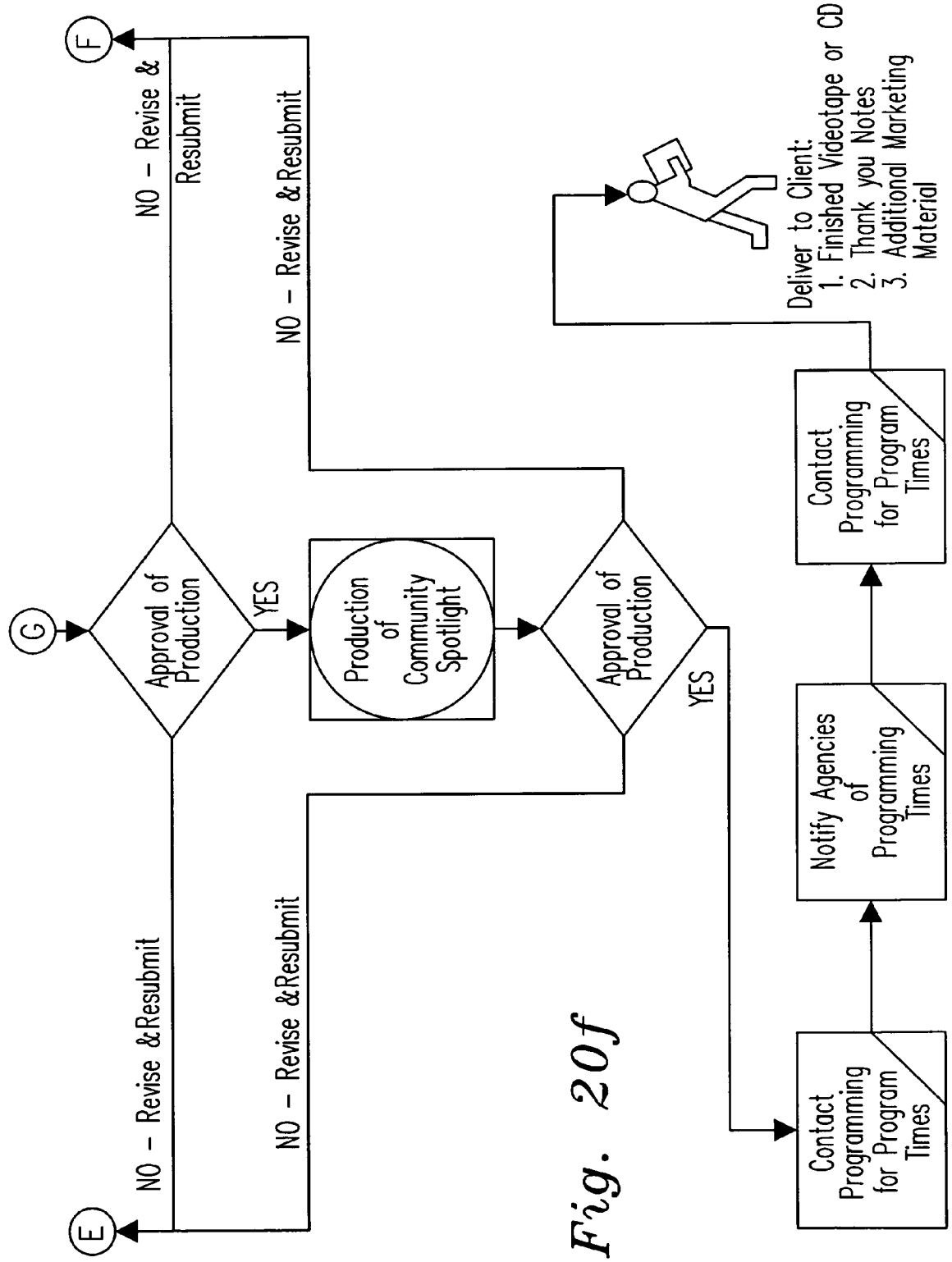
FIG. 20f is a flowchart of a sixth portion of the eleventh preferred computer process.
Figure 21:
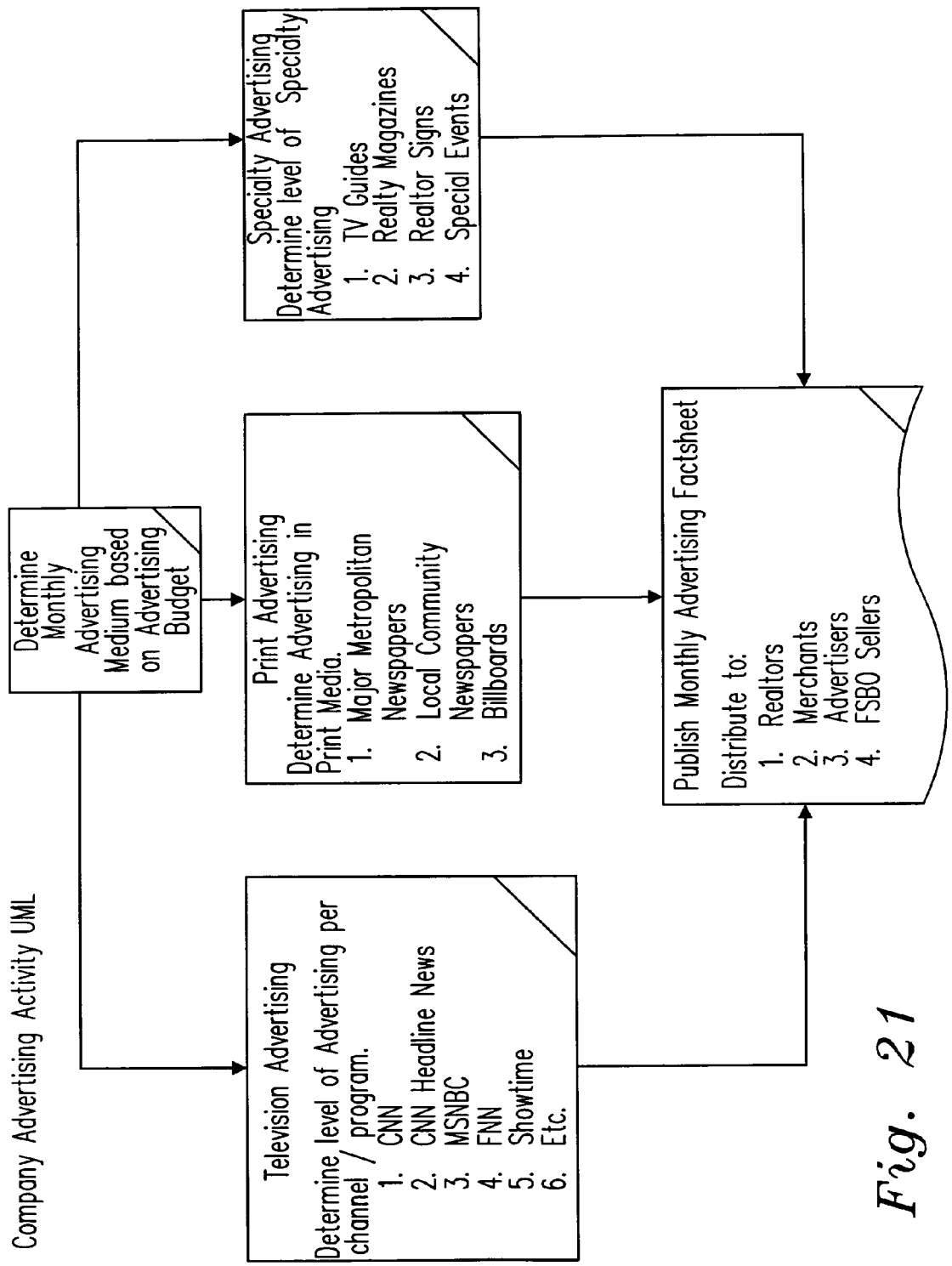
FIG. 21 is a flowchart of a twelfth preferred computer process for company advertising.
Figure 22:
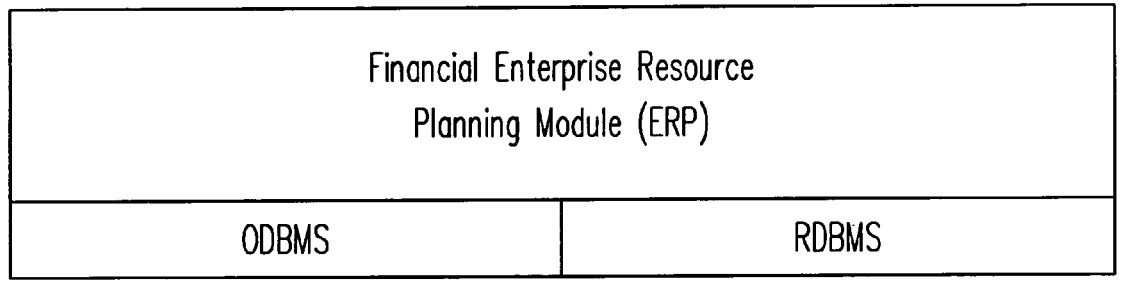
FIG. 22 is an illustration of a scheduling module according to the present invention.
Figure 23:
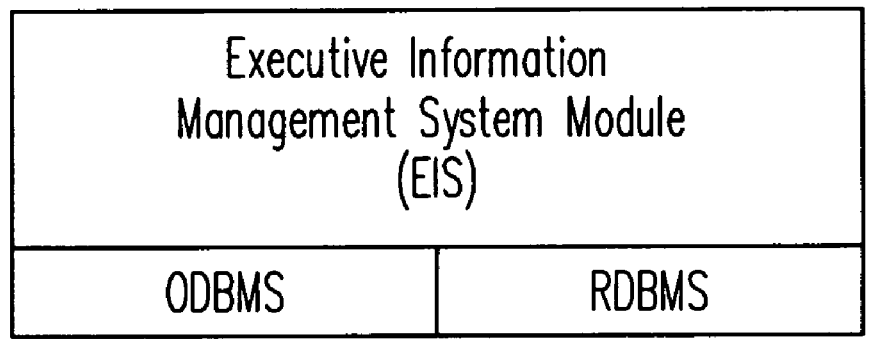
FIG. 23 is an illustration of an executive information management system module according to the present invention.
Figure 24:
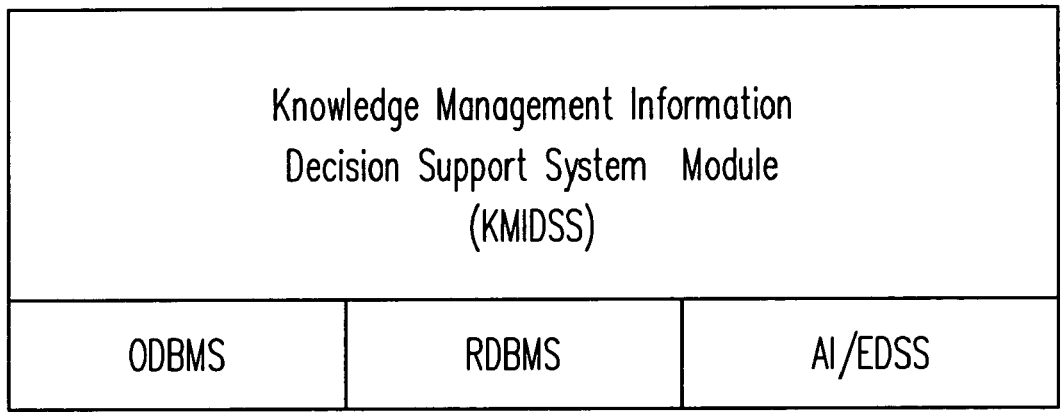
FIG. 24 is an illustration of a knowledge management module according to the present invention.

The Terrestrial Submodule. Direct connection to a company's virtual private network (VPN) will provide distribution. The terrestrial submodule 44 is not expected to be implemented until datacasting contracts have been implemented. MPEG-2 datasets will be distributed under this network architecture. To provide the widest dissemination of programming and repetitive marketing, a television-programming format may be designed based on a unique program rotation and is depicted at FIGS. 15a–b.

The CS, OVS, and MMDS Submodules. For connectivity to cable video distribution systems, like cable TV, OVS, and MMDS, to provide MPEG-2 digital media. Distribution to headends will also be available under this distribution architecture. To provide the widest dissemination of programming and repetitive marketing, a television-programming format is designed based on a unique program rotation and is depicted at FIGS. 15a–b.

Wireless Network Submodule. For connectivity to wireless networks, hybrid network equipment will provide management and monitoring over ATM LAN-WAN interconnects. Media datasets will include various viewing capabilities depending on connection speed and bandwidth.

Data Network Submodule. For connectivity to data networks, several plug-in equipment systems with specific playback applications will be provided as sub-modules. Playback applications have proprietary front-ends and additional functionalities. Distribution to a virtual private network (VPN), cable modem networks, DSL networks or any other high-bandwidth is provisioned over an ATM LAN-WAN interconnect. Hybrid network equipment will perform user management and monitoring. All content is provided over an WAN interconnect to the public Internet. Various digital media datasets will be distributed under this network architecture.

GMIPS Specialty Modules. In addition to the base modules 12, the GMIPS 10 may include a plurality of specialty modules 54 for providing overall management of the GMIPS 10. The specialty modules 54 preferably include a first submodule 56 (hereinafter referred to as the Sales & Marketing Customer Relationship Management or CRM module) specially configured for dissemination of sales and marketing information, a second submodule 58 (hereinafter referred to as the Financial Enterprise Resource Planning or FERP module) specially configured for financial planning, a third submodule 60 (hereinafter referred to as the Executive Information System or EIS module) specially configured for providing a proprietary front-end, and a fourth submodule 62 (hereinafter referred to as the Knowledge Management Information Decision Support System or KMIDSS module) for analyzation and knowledge discovery. Each one of the specialty modules 54 has a proprietary front-end for different operating centers. More specifically, the front ends include, a local operation center (not shown), a regional operation center (not shown), a regional production facility (not shown), and a central operation center (not shown). Each module has secure encrypted connectivity service to different centers by means of a VPN. Data relationships are set by level to access data by operating level. These modules are not required for implementation of the basic GMIPS system.

The (Sales and Marketing) CRM Module. The CRM module 56 serves to disseminate sales and marketing information throughout an enterprise. The CRM module 56 preferably includes the shared ODBMS module 22 and a first relational database management system (RDBMS) 66. Three relational database management systems (RDBMS) (not shown) are created from the shared ODBMS module 22 and are accessed to consolidate information for use by the marketing, sales, and central executive departments. Information concerning sales, advertising, and production information can be accessed via a company virtual private network (not shown). An Internet information application is accessible for Internet related information. A marketing research department may use a separately generated RDBMS (not shown) for statistical analysis. A statistical analysis RDBMS (not shown) may retain and analyze the following demographic information:

viewership (e.g., television, wireless, data network, etc.),
advertiser Solicitation,
monthly housing market data,
seller and buyer data,
VPN & Internet usage data,
multimedia magazine usage data,
mortgage referral data, and
real estate agency referral data.

This information may be compiled using proprietary data compilation front-ends for different operating centers. Real-time data access may provide current demographic information regarding all areas of marketing management. Financial information, is not accessible via the CRM module 56. FIGS. 17a–21 show flowcharts of preferred processes executed by UMLs.

The FERP Module. The financial enterprise resource management (FERP) module 58 provides resource planning for each operating activity of an enterprise. The FERP Module 58 incorporates the shared ODBMS 22 and a second RDBMS 70. The RDBMS 70 is created from the ODBMS 22. Access to this module is user specific and requires handshake identification to a unique workstation GUID for authentication. The FERP 58 uses secure encrypted IPsec connectivity across a virtual private network (not shown). FERP analysis is conducted via an open database connectivity (ODBC) to financial analysis applications for financial reporting and analysis.

The EIS Module. The EIS module 60 serves to provide a proprietary front-end for reporting information for each operating activity with the enterprise. Essentially, the EIS module 60 serves as an executive information management system for the enterprise. Several predefined periodic (e.g., daily, weekly, and monthly) reports are provided for each level of the enterprise. A report writer application is able to access data from all database management systems (DBMS) located anywhere in the enterprise. Access to the EIS module 60 is user specific and will require handshake identification to a unique workstation GUID for authentication. The EIS module 60 uses secure encrypted IPsec connectivity across the VPN. Financial analysis information is only made available on a user specific basis.

The KMIDSS Module. The KMIDSS module 62 serves to provide proprietary applications for analyzation and knowledge discovery based on data contained in data repositories. Selected data obtained from the CRM module 56 or the FERP module 58 is retained in separate RDBMS for use by decision support applications. The KMIDSS module 62 uses commercially available software applications. Authorized virtual private network users will be granted access the KMIDSS module 62.

Figure 25:
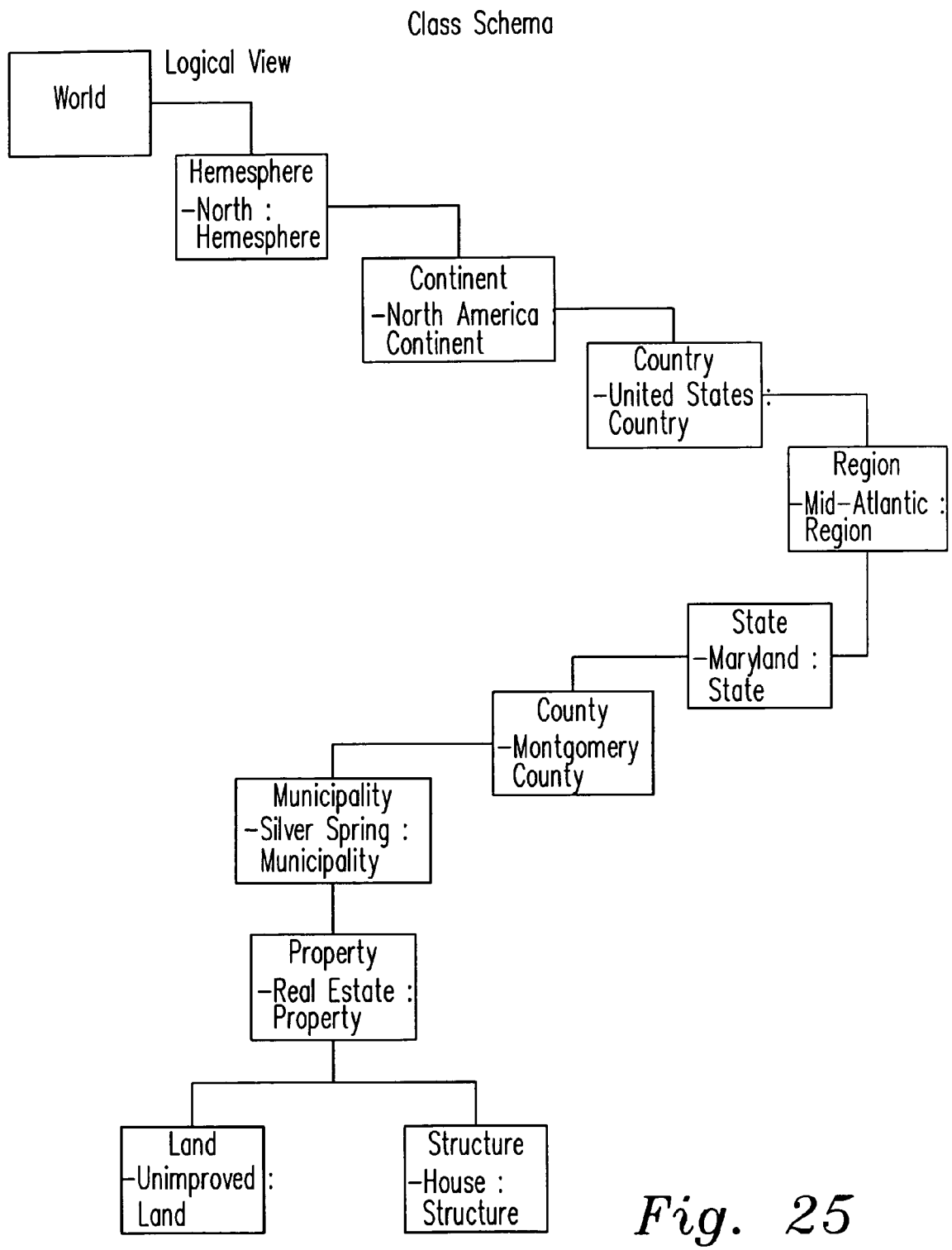
FIG. 25 is an illustration of a preferred class schema according to the present invention.

Information Processing. Data concerning geospatial entities are obtained through a variety of methods including direct data acquisition, use of the GMIPS acquisition module 16 and GMR 32, secondary databases, and other information sources. Each entity acquired by the GMR 32 includes geographic coordinates (in decimal notation), altimetric position, timestamp data and coordinated Universal Time code (UTC). When geographic coordinates, altimetry, and timestamp parameters are concatenated into any sequence and are stored, referenced or used in data processing, then concatenated data constitutes GeoSpatial Entity Object Code (a.k.a., GEOCode). If geographic coordinates, altimetric position, and timestamp data are stored in a object class under UML modeling schema or are stored in a concatenated data attribute under textual, relational, or object-relational database schema, then the derived data type constitutes a GeoSpatial Entity Object Code (GEOCode). An ODBMS class schema is depicted in FIG. 25. A geospatial object class is shown in FIG. 26 in UML notation.

Figure 26:
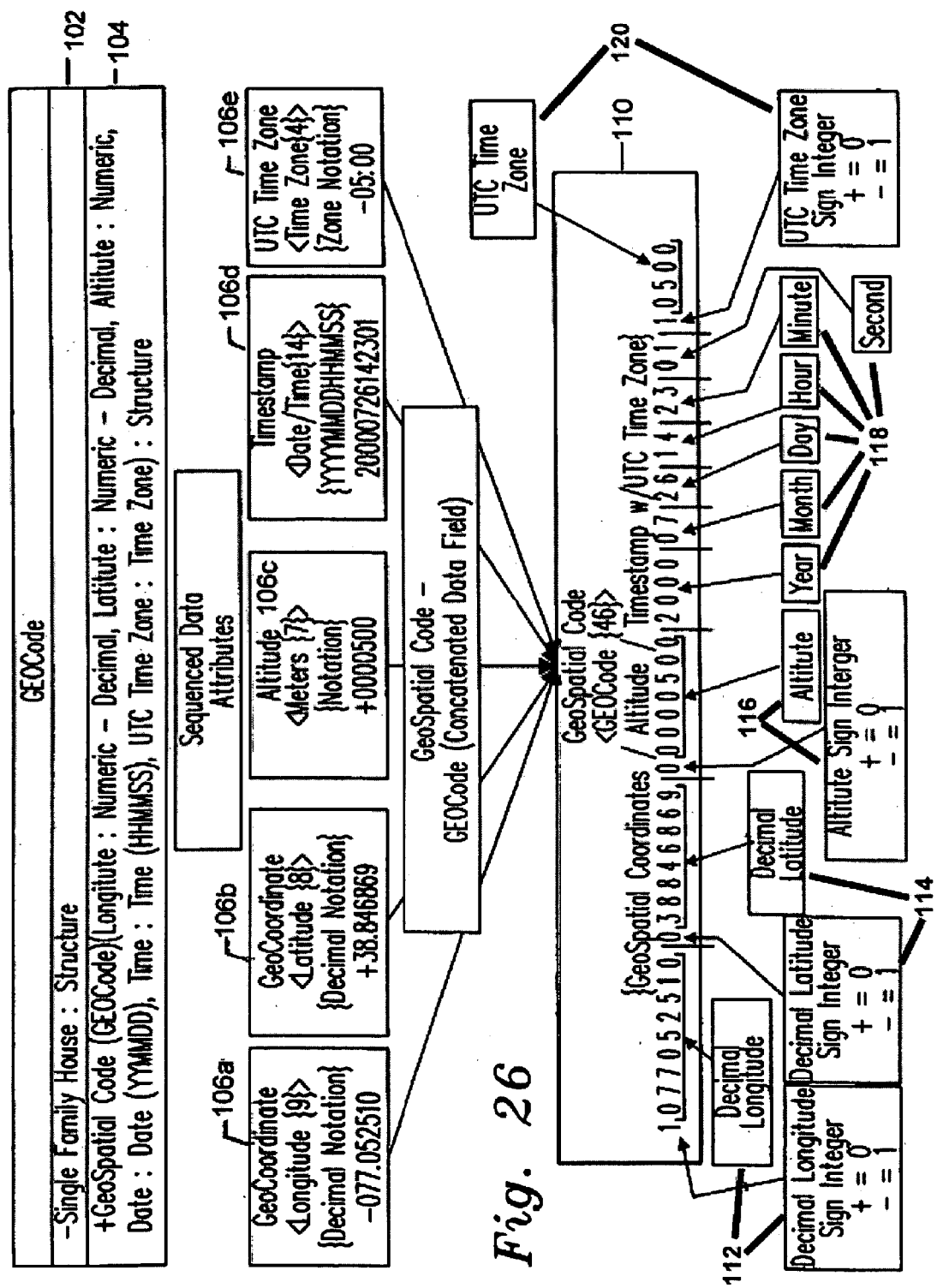
FIG. 26 is an illustration of a preferred UML Class according to the present invention.

FIG. 26 illustrates a geospatial information processing (GEOCode) 104 in UML Class notation and 110 in an all-numeric representation, in accordance with an embodiment of the present invention. For exemplary purposes, the GEOCode in UML Class notation 104 and 110 in numeric representation of the GMIPS provides geospatial positional location and point identification referencing for visual and audio information of a single family house 102 in accordance with an embodiment of the present invention. The GEOCode 110 provides a numeric representation converted from longitude and latitude in geographic degree, minutes, and seconds (DMS) coordinate alphanumeric representations or decimal equivalent geographic coordinate alphanumeric representations and altitude alphanumeric representations 106a–106e into individual discrete all-natural number geographic coordinate and measurement representations of longitude 112, latitude 114, altitude 116 and additional spatial information 118 and 120 (i.e., individual all-numeric geospatial data attributes). The GEOCode in all-numeric representation 110 concatenates 112–120 the individual discrete all-natural number geographic and measurement representations into a single discrete all-natural number geospatial coordinate measurement representation 110 for identification of a geospatial positional location and point identification at, below, or above earth's surface, in this case the geospatial positional location and point identification reference of the single family house. The single discrete all-natural number geospatial coordinate measurement representation 110 may include longitude 112, latitude 114, altitude 116, timestamp 118 including year, month, day, hour, minute, second, and UTC time zone 120 and other spatial information.

Timestamping. Under SQL-92 timestamping is defined as an object or data attribute that contains data and time. The granularity of a specified data attribute depends on a database in a different fashion. For the GMIPS 10, a timestamp is defined as an object or data attribute containing the date in YY-MM-DD format and time in hours-minutes-second format or any sequential order of these parameters. Additionally, timestamping may include a time zone based on Coordinated Universal Time (UTC) for the ODBMS 22 and an upgrade of the current version of the structured query language (SQL) called SQL-3. Preferably, timestamping includes any object or data attribute containing the date in YY-MM-DD format and time in hours-minutes-second format and UTC time zone or any sequential order of these parameters.

Preprocessing. Data obtained through customer-provided information data sheets, direct observation, metering, or other database sources are scrubbed and entered into the GMIPS 10. Each object or record is automatically updated with data obtained from public information sources, which include the following:
  property ownership records
  U.S. Postal Service Addresses
  Property Construction Information
  Mortgage Records Primary Data Processing. Primary data processing includes data obtained and processed in the four base modules 12.

Secondary Data Processing. Secondary data processing includes data created or derived from the base modules 12. This includes data to be used for customer relationship management (CRM) and financial enterprise resource planning (FERP) modules.

Post-processing. Post processing includes data used from the GMIPS base modules 12 and specialty modules 54, which includes the CRM module 56 and FERP module 58. Detailed reporting and compendiums are generated from the EIS module 60. The KMIDSS module 62 is preferably provided in a post-processing module.

It is to be understood that the present invention is not limited to the sole embodiments described above, but encompass any and all embodiments within the scope of the following claims.

I claim:

1. A geospatial media recorder, comprising:
  converting means for converting longitude and latitude geographic degree, minutes, and seconds (DMS) coordinate alphanumeric representations or decimal equivalent geographic coordinate alphanumeric representations and altitude alphanumeric representations into individual discrete all-natural number geographic coordinate and measurement representations; and
  combining means for concatenating the individual discrete all-natural number geographic coordinate and measurement representations into a single discrete all-natural number geospatial coordinate measurement representation for identification of a geospatial positional location at, below, or above earth's surface allowing user to geospatially reference entities or objects based on the identified geospatial positional location and point identification.

2. The geospatial media recorder according to claim 1, wherein the converting means further converts latitude and longitude coordinates and additional spatial information comprising date, local time, and global time into the individual discrete all-natural number geographic coordinate and measurement representations for encoding onto a data segment of a video frame at a time of media acquisition.

3. The geospatial media recorder according to claim 2, further comprising:
  encoding means for encoding the single discrete all-natural number geospatial coordinate measurement representation onto the data segment of the video frame at a time of geospatial data acquisition.

4. The geospatial media recorder according to claim 3, further comprising:
  capturing means having a geospatial receiver interconnected with a focus element at a first location, said capturing means for capturing information of an entity at a second location, and geospatially referencing the second location to the first location in accordance with a focus ratio of the focus element and the single discrete all-natural number geospatial coordinate measurement representation associated with the geospatial receiver.

5. The medium according to claim 1, wherein the single discrete all-natural number geospatial coordinate measurement representation is stored in an encapsulated object class and the single discrete all-natural geospatial coordinate measurement representation is written on media or encoded on a medium.

6. The geospatial media recorder according to claim 1, wherein the converting means is further configured to convert additional spatial information comprising date, local time, and global time into the individual discrete all-natural number geographic coordinate and measurement representations for encoding onto a data segment of a video frame at a time of media acquisition.

7. An acquisition module for acquiring geospatial data, said acquisition module comprising:
  encoding means for encoding geospatial data onto a data segment of a video frame at a time of geospatial data acquisition;
  capturing means having a geospatial receiver interconnected with a focus element at a first location, said capturing means being configured for capturing information of an entity at a second location, and geospatially referencing the second location to the first location in accordance with a focus ratio of the focus element and geospatial data associated with the geospatial receiver; and
  converting means for converting latitude and longitude coordinates or decimal equivalent coordinates and additional spatial information into a concatenated single discrete all-natural numeric geospatial data format for encoding onto the data segment of the video frame at a time of media acquisition allowing a user to geospatially reference entities or objects based on the encoded concatenated single discrete all-natural numeric geospatial data format.

8. The acquisition module according to claim 7, wherein said converting means stores the concatenated single discrete all-natural numeric geospatial data format in an encapsulated object class.

9. A geospatial information processing method comprising:
converting latitude and longitude geographic degree, minutes, and seconds (DMS) coordinate alphanumeric representations or decimal equivalent geographic coordinate alphanumeric representations and altitude alphanumeric representations into individual discrete all-natural number geographic coordinate and measurement representations; and
concatenating the individual discrete all-natural number geographic coordinate and measurement representations into a single discrete all-natural number geospatial coordinate measurement representation for identification of a geospatial positional location at, below, or above earth's surface allowing a user to geospatially reference entities or objects based on the identified geospatial positional location and point identification.

10. The geospatial information processing method according to claim 9, further comprising:
encoding the single discrete all-natural number geospatial coordinate measurement representation onto a data segment of a video frame at a time of geospatial data acquisition.

11. The geospatial information processing method according to claim 9, further comprising:
providing a geospatial receiver interconnected with a focus element at a first location for capturing information of an entity at a second location; and
geospatially referencing the second location to the first location in accordance with a focus ratio of the focus element and the single discrete all-natural number geospatial coordinate measurement representation associated with the geospatial receiver.

12. The geospatial information processing method according to claim 9, further comprising:
writing the single discrete all-natural number coordinate measurement representation on media.

13. The geospatial information processing method according to claim 9, further comprising:
encoding the single discrete all-natural number geospatial coordinate measurement representation on a medium.

14. The geospatial information processing method according to claim 9, further comprising:
storing the single discrete all-natural number geospatial coordinate measurement representation in an encapsulated object class.

15. The geospatial information processing method according to claim 9, wherein the converting step further comprises converting additional spatial information comprising date, local time, and global time into the individual discrete all-natural number geographic coordinate and measurement representations for encoding onto a video frame at a time of media acquisition and the concatenating step further comprises concatenating the individual discrete all-natural number geographic coordinate and measurement representations into the single discrete all-natural number geospatial coordinate measurement representation.

16. A geospatial media recorder, comprising:
a converter configured to convert longitude and latitude geographic degree, minutes, and seconds (DMS) coordinate alphanumeric representations or decimal equivalent geographic coordinate alphanumeric representations and altitude alphanumeric representations into individual discrete all-natural number geographic coordinate and measurement representations; and
a converting unit configured to concatenate the individual discrete all-natural number geographic coordinate and measurement representations into a single discrete all-natural number geospatial coordinate measurement representation for identification of a geospatial positional location at, below, or above earth's surface allowing a user to geospatially reference entities or objects based on the identified geospatial positional location and point identification.

17. A geospatial media recorder configured to record geospatial data at a location, comprising:
a media capturing unit configured to acquire geospatial referenced visual and audio information; and
a geospatial media encoder having a geospatial receiver, the geospatial media encoder configured to
capture geospatial location information of the media recorder at a first location,
geospatially reference a second location to the first location in accordance with the geospatial data associated with the geospatial receiver,
calculate at the first location and during media acquisition geospatial location of the objects or entities at the second location using field measurements of the objects or entities at the second location based on the geospatial data of the media recorder, and
convert latitude and longitude coordinates and additional spatial information comprising date, local time, and global time into the individual discrete all-natural number geographic coordinate and measurement representations for encoding onto a video frame at a time of media acquisition allowing a user to geospatially reference entities or objects based on the encoded concatenated single discrete all-natural numeric geospatial data format.

* * * * *